(12) United States Patent
Murai et al.

(10) Patent No.: US 12,073,200 B2
(45) Date of Patent: Aug. 27, 2024

(54) COMPILER DEVICE, INSTRUCTION GENERATION METHOD, PROGRAM, COMPILING METHOD, AND COMPILER PROGRAM

(71) Applicant: Preferred Networks, Inc., Tokyo (JP)

(72) Inventors: Shogo Murai, Tokyo (JP); Shinichiro Hamaji, Tokyo (JP); Taiju Tsuiki, Tokyo (JP)

(73) Assignee: Preferred Networks, Inc., Tokyo (JP)

( * ) Notice: Subject to any disclaimer, the term of this patent is extended or adjusted under 35 U.S.C. 154(b) by 32 days.

(21) Appl. No.: 18/048,937

(22) Filed: Oct. 24, 2022

(65) Prior Publication Data
US 2023/0131430 A1    Apr. 27, 2023

(30) Foreign Application Priority Data
Oct. 25, 2021 (JP) ................. 2021-173842

(51) Int. Cl.
*G06F 8/41* (2018.01)
*G06F 9/30* (2018.01)
*G06F 9/38* (2018.01)

(52) U.S. Cl.
CPC .......... *G06F 8/445* (2013.01); *G06F 9/30076* (2013.01); *G06F 9/3887* (2013.01)

(58) Field of Classification Search
CPC ...................................................... G06F 8/41
See application file for complete search history.

(56) References Cited

U.S. PATENT DOCUMENTS

2004/0019766 A1   1/2004   Kawaguchi
2005/0102560 A1*  5/2005   Taketoshi ............ G06F 9/30189
                                                            712/E9.035
(Continued)

FOREIGN PATENT DOCUMENTS

JP   2000-284970   10/2000
JP   2005-535974   11/2005
(Continued)

OTHER PUBLICATIONS

Hiroya Kaneko, "Accelerating Deep Learning Workloads with the MN-Core Compiler", Jun. 11, 2021, <https://tech.preferred.jp/en/blog/mncore-compiler-1/>, retrieved on Aug. 24, 2021.
(Continued)

*Primary Examiner* — Jae U Jeon
(74) *Attorney, Agent, or Firm* — IPUSA, PLLC

(57) ABSTRACT

A compiler device, for generating an instruction sequence to be executed by an arithmetic processing device, includes at least one memory and at least one processor. The at least one processor is configured to receive a first instruction sequence for a first process and a second instruction sequence for a second process to be executed after the first process; generate third instructions, each third instruction being generated by merging a first instruction included in the first instruction sequence and a second instruction included in the second instruction sequence; and generate a third instruction sequence by concatenating the third instructions, instructions included in the first instruction sequence that are not merged into the third instructions, and instructions other than the second instruction among the plurality of instructions included in the second instruction sequence that are not merged into the one or more third instructions.

20 Claims, 13 Drawing Sheets

(56) References Cited

U.S. PATENT DOCUMENTS

| | | | |
|---|---|---|---|
| 2016/0062769 A1* | 3/2016 | Park | G06F 9/30058 |
| | | | 712/235 |
| 2016/0124671 A1* | 5/2016 | Wang | G06F 3/0661 |
| | | | 713/323 |
| 2016/0342568 A1 | 11/2016 | Burchard et al. | |
| 2017/0249716 A1 | 8/2017 | Meixner et al. | |
| 2018/0285254 A1 | 10/2018 | Baum et al. | |
| 2019/0102197 A1* | 4/2019 | Kumar | G06F 9/3016 |
| 2021/0191868 A1 | 6/2021 | Ray et al. | |

FOREIGN PATENT DOCUMENTS

| | | |
|---|---|---|
| JP | 2018-518753 | 7/2018 |
| JP | 2020-061168 | 4/2020 |
| JP | 2020-515991 | 5/2020 |
| JP | 2021-099786 | 7/2021 |
| WO | 2004/017197 | 2/2004 |

OTHER PUBLICATIONS

Preferred Networks, Inc., "MN-Core Accelerator for Deep Learning", <https://projects.preferred.jp/mn-core/en/>, retrieved on Aug. 24, 2021.

Preferred Networks, Inc., "MN-Core Custom deep learning processor", <https://www.preferred.jp/en/projects/mn-core/>, retrieved on Aug. 24, 2021.

Hiroshige Goto, "AVX-512—Key to Intel's 10nm Generation CPU Core 'Sunny Cove'", Feb. 1, 2019 Retrieved from the Internet <https://pc.watch.impress.co.jp/docs/column/kaigai/1167662.html>.

* cited by examiner

| INSTRUCTION 1 | | INSTRUCTION 2 | | | INSTRUCTION 1+2 | |
|---|---|---|---|---|---|---|
| EX | FIRST ARITHMETIC OPERATION | EX | FIRST ARITHMETIC OPERATION | | EX | FIRST ARITHMETIC OPERATION |
| MEM0 <-> MEM1 | - | MEM0 <-> MEM1 | - | CAN BE MERGED ⇒ | MEM0 <-> MEM1 | - |
| MEM1 <-> MEM2 | - | MEM1 <-> MEM2 | - | | MEM1 <-> MEM2 | - |
| MEM2 <-> MEM3 | - | MEM2 <-> MEM3 | MEM2 <- MEM3 | | MEM2 <-> MEM3 | MEM2 <- MEM3 |

(B)

| INSTRUCTION 1 | | INSTRUCTION 2 | | | INSTRUCTION 1+2 | |
|---|---|---|---|---|---|---|
| EX | FIRST ARITHMETIC OPERATION | EX | FIRST ARITHMETIC OPERATION | | EX | FIRST ARITHMETIC OPERATION |
| MEM0 <-> MEM1 | - | MEM0 <-> MEM1 | MEM0 <- MEM1 | CAN BE MERGED CONDI- TIONALLY ⇒ | MEM0 <-> MEM1 | MEM0 <- MEM1 |
| MEM1 <-> MEM2 | - | MEM1 <-> MEM2 | - | | MEM1 <-> MEM2 | - |
| MEM2 <-> MEM3 | - | MEM2 <-> MEM3 | - | | MEM2 <-> MEM3 | - |

(C)

| INSTRUCTION 1 | | INSTRUCTION 2 | | | INSTRUCTION 1+2 | |
|---|---|---|---|---|---|---|
| EX | FIRST ARITHMETIC OPERATION | EX | FIRST ARITHMETIC OPERATION | | EX | FIRST ARITHMETIC OPERATION |
| MEM0 <-> MEM1 | - | MEM0 <-> MEM1 | MEM0 -> MEM1 | CAN BE MERGED CONDI- TIONALLY ⇒ | MEM0 <-> MEM1 | MEM0 -> MEM1 |
| MEM1 <-> MEM2 | - | MEM1 <-> MEM2 | - | | MEM1 <-> MEM2 | - |
| MEM2 <-> MEM3 | - | MEM2 <-> MEM3 | MEM2 -> MEM3 | | MEM2 <-> MEM3 | MEM2 -> MEM3 |

| INSTRUCTION 1 | | | INSTRUCTION 2 | | | | INSTRUCTION 1+2 | | |
|---|---|---|---|---|---|---|---|---|---|
| EX | — | | EX | — | | | EX | — | |
| MEM0 <–> MEM1 | MEM0 –> MEM1 | | MEM0 <–> MEM1 | — | | CAN BE MERGED ⇒ | MEM0 <–> MEM1 | MEM0 –> MEM1 | |
| MEM1 <–> MEM2 | — | | MEM1 <–> MEM2 | — | | | MEM1 <–> MEM2 | — | |
| MEM2 <–> MEM3 | — | | MEM2 <–> MEM3 | MEM2 –> MEM3 | | | MEM2 <–> MEM3 | MEM2 –> MEM3 | |

(E)

| INSTRUCTION 1 | | INSTRUCTION 2 | | | INSTRUCTION 1+2 | |
|---|---|---|---|---|---|---|
| EX | FIRST ARITHMETIC OPERATION | EX | SECOND ARITHMETIC OPERATION | | EX | FIRST ARITHMETIC OPERATION / SECOND ARITHMETIC OPERATION |
| MEM0 <–> MEM1 | — | MEM0 <–> MEM1 | — | CAN BE MERGED CONDI- TIONALLY ⇒ | MEM0 <–> MEM1 | — |
| MEM1 <–> MEM2 | — | MEM1 <–> MEM2 | — | | MEM1 <–> MEM2 | — |
| MEM2 <–> MEM3 | — | MEM2 <–> MEM3 | — | | MEM2 <–> MEM3 | — |

(F)

| INSTRUCTION 1 | | | INSTRUCTION 2 | | | INSTRUCTION 1+2 | |
|---|---|---|---|---|---|---|---|
| EX | FIRST ARITHMETIC OPERATION | | EX | — | | EX | FIRST ARITHMETIC OPERATION |
| MEM0 <–> MEM1 | — | | MEM0 <–> MEM1 | MEM0 <– MEM1 | CAN BE MERGED CONDI- TIONALLY ⇒ | MEM0 <–> MEM1 | MEM0 <– MEM1 |
| MEM1 <–> MEM2 | — | | MEM1 <–> MEM2 | — | | MEM1 <–> MEM2 | — |
| MEM2 <–> MEM3 | — | | MEM2 <–> MEM3 | MEM2 <– MEM3 | | MEM2 <–> MEM3 | MEM2 <– MEM3 |

COMPILER DEVICE, INSTRUCTION GENERATION METHOD, PROGRAM, COMPILING METHOD, AND COMPILER PROGRAM

CROSS-REFERENCE TO RELATED APPLICATIONS

This application is based upon and claims priority to Japanese Patent Application No. 2021-173842 filed on Oct. 25, 2021, the entire contents of which are incorporated herein by reference.

BACKGROUND

1. Technical Field

The present disclosure relates to a compiler device, an instruction generation method, a program, a compiling method and a compiler program.

2. Description of the Related Art

In general, deep learning is performed using a processor with many cores, such as a Graphics Processing Unit (GPU). Recently, processors (accelerators) specialized in deep learning have been developed to increase a calculation speed in deep learning.

An architecture of processors dedicated to deep learning (the number of arithmetic operators, the number of blocks including an arithmetic operator, the number of hierarchies of blocks and instructions, etc.) may differ from that of general-purpose products such as a GPU. Therefore, in order to operate a processor specialized in deep learning efficiently, it is important to have a compiler device that appropriately generates an instruction to be executed by the processor.

SUMMARY

In the present disclosure, a processing performance of an arithmetic processing device is improved by merging the instruction to be executed by the arithmetic processing unit.

According to an embodiment of the present disclosure, a compiler device, for generating an instruction sequence to be executed by an arithmetic processing device, includes at least one memory and at least one processor is provided. The at least one processor is configured to receive a first instruction sequence for executing a first process and a second instruction sequence for executing a second process to be executed after the first process; generate one or more third instructions, each third instruction being generated by merging a first instruction included in the first instruction sequence and a second instruction included in the second instruction sequence, the first instruction and the second instruction being executable in parallel; and generate a third instruction sequence by concatenating the one or more third instructions, instructions included in the first instruction sequence that are not merged into the one or more third instructions, and instructions included in the second instruction sequence that are not merged into the one or more third instructions.

BRIEF DESCRIPTION OF THE DRAWINGS

FIG. 8 is a diagram illustrating an example of merging two instructions;

FIG. 9 is a diagram illustrating another example of merging two instructions;

DETAILED DESCRIPTION

Hereinafter, embodiments of the present disclosure will be described in detail with reference to the drawings.

Figure 1:
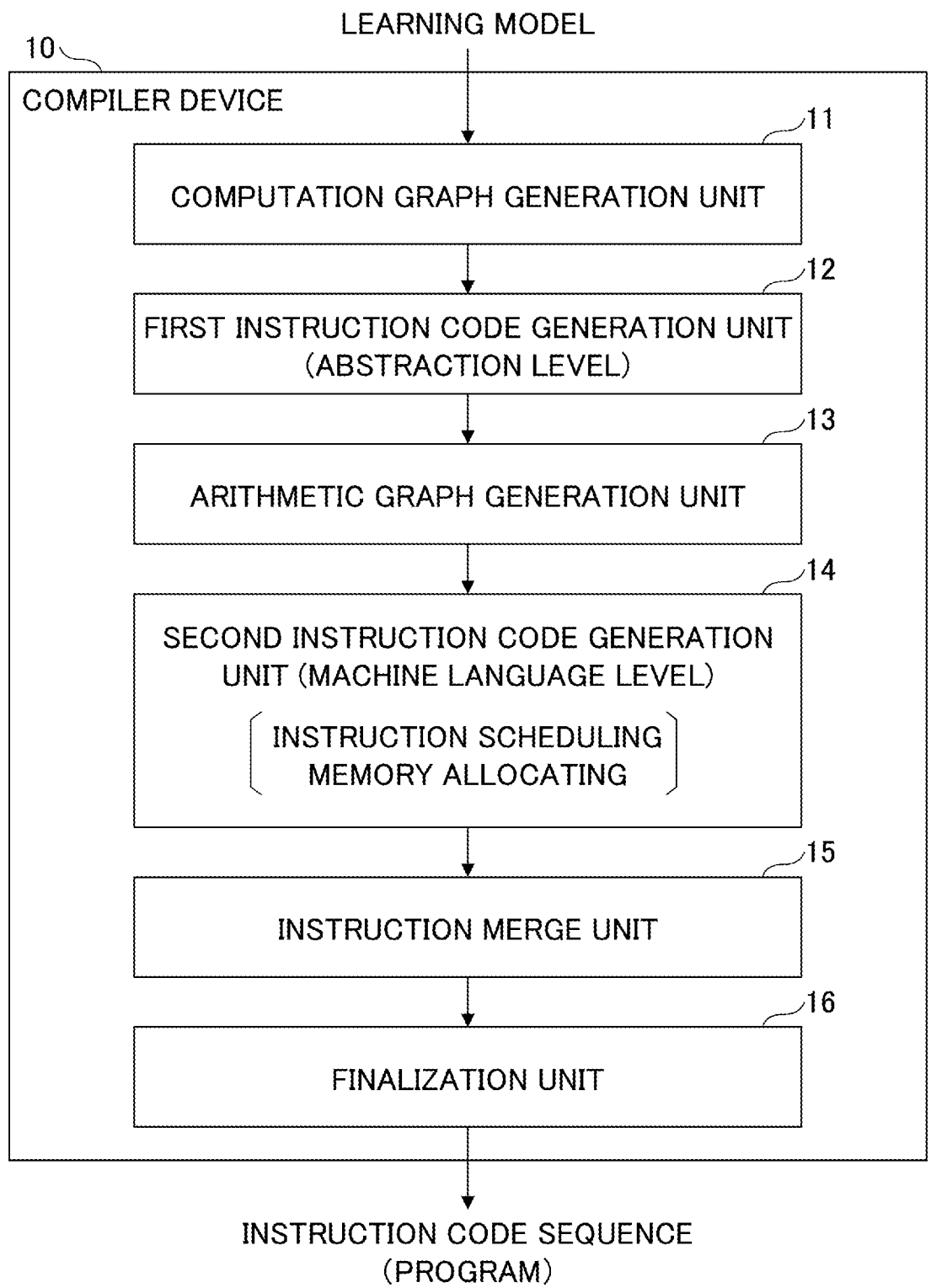
FIG. 1 is a functional block diagram illustrating an example of a compiler device according to an embodiment of the present disclosure.

FIG. 1 is a functional block diagram illustrating an example of a compiler device according to an embodiment of the present disclosure. For example, a compiler device 10 illustrated in FIG. 1 is implemented by a processor such as a Central Processing Unit (CPU) embedded in an information processing device (computer) such as a server executing a compiler program. The compiler device 10 executes the compiler program and generates an instruction code to be executed by an arithmetic processing device 100 illustrated in FIG. 2. The compiler device 10 includes a computation graph generation unit 11, a first instruction code generation unit 12, an arithmetic graph generation unit 13, a second instruction code generation unit 14, an instruction merge unit 15, and a finalization unit 16.

The computation graph generation unit 11 generates a computation graph based on a learning model (e.g., source code) generated by using, for example, a general-purpose library (framework) for deep learning. The computation graph represents a dependency between calculations (e.g., an input of a certain calculation is given from either an output of a calculation or an input of the entire model, or the like) when expressing a learning model as a combination of calculation processes commonly used in deep learning, such as a convolution operation, batch normalization, and an activation function operation. The first instruction code generation unit 12 generates an abstraction level instruction code using a computation graph generated by the computation graph generation unit 11. Here, the abstraction level instruction code may be written, for example, in a high-level language that cannot be directly executed by the processor implemented in a calculator.

Rather than converting the computation graph based on the learning model into a single instruction code sequence including the abstraction level instruction code, the first instruction code generation unit 12 determines an execution sequence of processing at the level of the basic operation to generate an instruction code for each basic operation. Here, the basic operation may include, for example, processing of a layer such as a convolution layer or a pooling layer, processing of a Rectified Linear Unit (ReLU) function, or processing of data transfer, and the like.

The arithmetic graph generation unit 13 generates an arithmetic graph based on the instruction code generated by the first instruction code generation unit 12. The arithmetic graph represents a dependency between the arithmetic operations when the calculation process of the computation graph is represented by a combination of the arithmetic operations (for example, a matrix product operation and an addition operation) that can be performed directly by the arithmetic processing device 100. The second instruction code generation unit 14 generates an instruction code at the machine language level based on the arithmetic graph generated by the arithmetic graph generation unit 13. For example, the second instruction code generation unit 14 generates an instruction code sequence including a plurality of instruction codes for each layer of the deep neural network. When generating the instruction code, the second instruction code generation unit 14 may perform instruction scheduling for determining the execution sequence of the instruction code and memory allocating for determining an allocation of a memory area used for executing the instruction code.

The instruction merge unit 15 searches for instructions which can be executed in parallel among the instructions included in a plurality of instruction code sequences generated by the second instruction code generation unit 14 and performs a merge process that merges the instructions which can be executed in parallel. The instruction merge unit 15 merges a part of instructions included in a plurality of instruction code sequences generated by the second instruction code generation unit 14 to generate a single instruction code sequence at the machine language level.

The finalization unit 16 finalizes an instruction code sequence generated by the instruction merge unit 15 and outputs an instruction code sequence in a machine language that can be executed directly by a processor. The finalized instruction code sequence is, for example, a program for deep learning executed by a processor. In the following description, the instruction code is also referred to as an instruction, and the instruction code sequence is also referred to as an instruction sequence.

Figure 2:
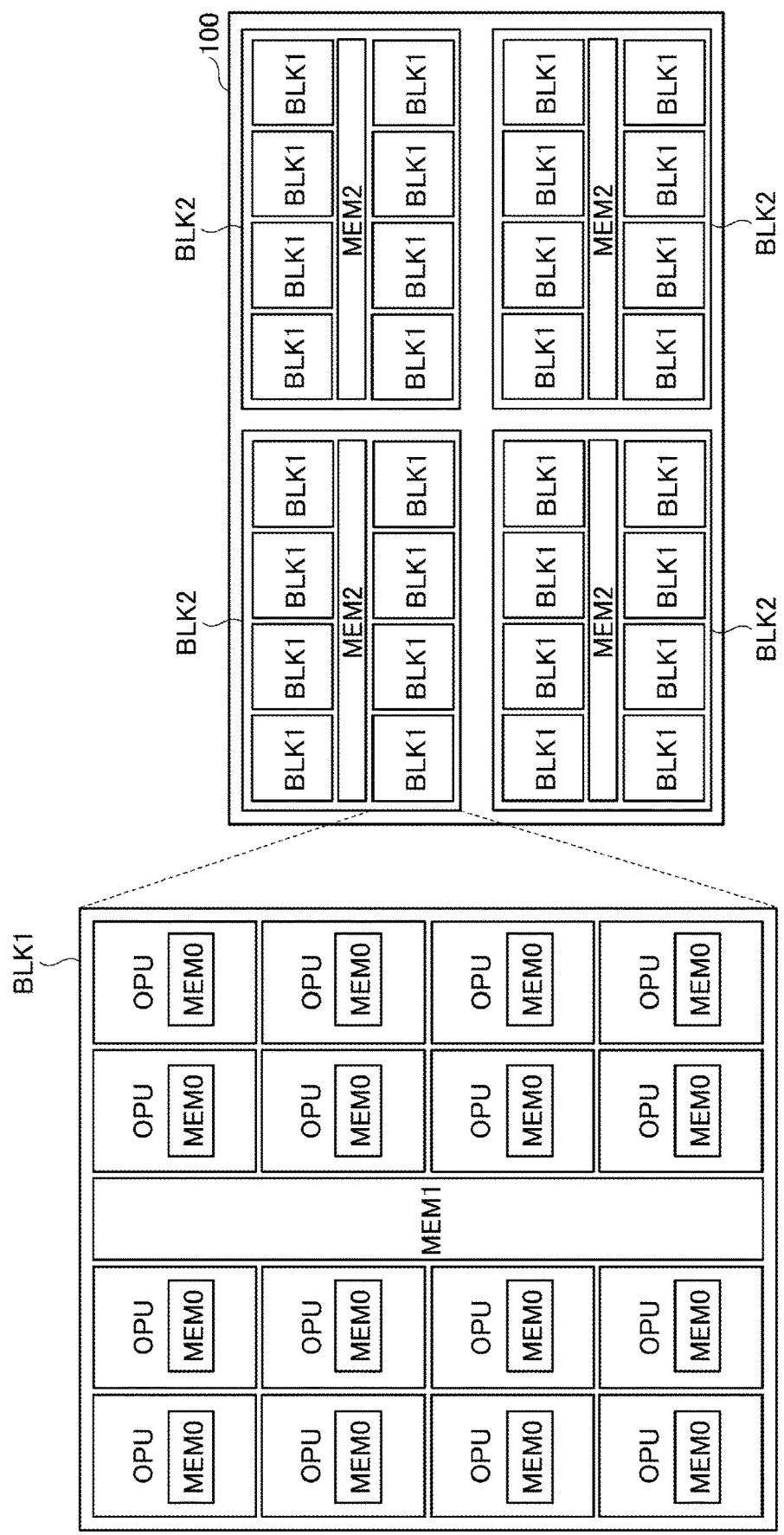
FIG. 2 is a block diagram illustrating an example of an arithmetic processing device for executing a program generated by the compiler device in FIG. 1.

FIG. 2 is a block diagram illustrating an example of an arithmetic processing device for executing a program generated by the compiler device 10 in FIG. 1. For example, the arithmetic processing device 100 illustrated in FIG. 1 may function as an accelerator for executing deep learning. The arithmetic processing device 100 may be in a form of a chip or in a form of a package such as a Chip Size Package (CSP).

The arithmetic processing device 100 includes multiple hierarchical arithmetic units and multiple memories. For example, the arithmetic processing device 100 includes a predetermined number of second hierarchical blocks BLK2. Each second hierarchical block BLK2 includes multiple first hierarchical blocks BLK1 and a memory MEM2 shared by the first hierarchical blocks BLK1. Each first hierarchical block BLK1 includes multiple arithmetic units OPU and a memory MEM1 shared by the multiple arithmetic units OPU. Each of the hierarchical arithmetic unit OPU, the first hierarchical block BLK1, and the second hierarchical block BLK2 is an example of a processing unit that performs processing based on the issued instruction. The arithmetic processing device 100 can efficiently perform data transfer between hierarchically arranged blocks by executing various data transfer instructions.

In the example illustrated in FIG. 2, the arithmetic processing device 100 includes four second hierarchical blocks BLK2. Each second hierarchical block BLK2 includes eight first hierarchical blocks BLK1. The first hierarchical block BLK1 includes 16 arithmetic units OPU. However, the number of the second hierarchical blocks BLK2, the number of the first hierarchical blocks BLK1 mounted in each second hierarchical block BLK2, and the number of the arithmetic units OPU mounted in each first hierarchical block BLK1 are not limited to as illustrated in FIG. 1. However, it is preferable that the number of the second hierarchical blocks BLK2 mounted in the arithmetic processing device 100, the number of the first hierarchical blocks BLK1 mounted in each second hierarchical block BLK2, and the number of the arithmetic units OPU mounted in each first hierarchical block BLK1 be n raised to the power of 2 (n is an integer of one or more).

Figure 3:
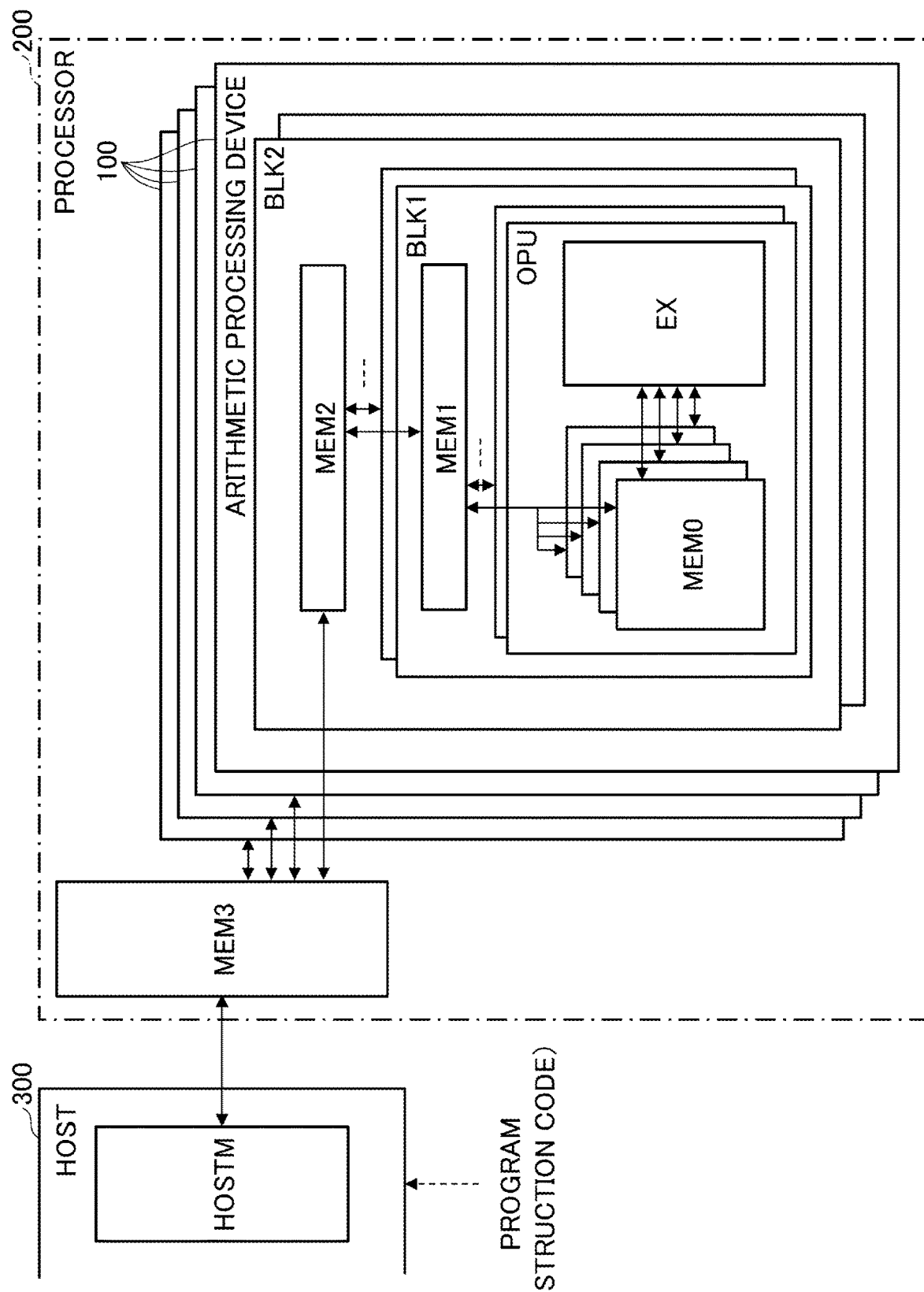
FIG. 3 is a block diagram illustrating an example of a system including a processor and a host on which the arithmetic processing device in FIG. 2 is mounted.

The arithmetic unit OPU includes a memory MEM0 as a memory of hierarchy 0. The first hierarchical block BLK1 includes a memory MEM1 as a first hierarchical memory, and the second hierarchical block BLK2 includes a memory MEM2 as a second hierarchical memory. The types of the memories MEM1 and MEM2 are not particularly limited, and an appropriate selection may be made according to the performance required of the arithmetic processing device 100. For example, in the present embodiment, a first data transfer instruction for transferring data between the memory MEM0 and the memory MEM1 in the arithmetic unit OPU and a second data transfer instruction for transferring data between the memory MEM1 and the memory MEM2 are provided. That is, data transfer instructions are provided between two adjacent hierarchies of the memories. A third data transfer instruction for transferring data between the memory MEM2 and a memory MEM3 (a memory outside the arithmetic processing device 100) illustrated as a third hierarchical memory in FIG. 3 is provided. That is, a data transfer instruction between the arithmetic processing device 100 and the memory MEM3 outside the arithmetic processing device 100 is provided. As described above, the arithmetic processing device 100 is capable of executing the data transfer instruction for each of two adjacent hierarchies of the memory.

For example, the arithmetic processing device 100 transfers data between the memory MEM0 and the memory MEM1 in each of all the first hierarchical blocks BLK1 in the arithmetic processing device 100 by executing the first data transfer instruction. The arithmetic processing device 100 transfers data between the memory MEM1 and the memory MEM2 in each of all the second hierarchical blocks BLK2 in the arithmetic processing device 100 by executing the second data transfer instruction. The arithmetic processing device 100 transmits data between the memory MEM2 and the memory MEM3 (refer to FIG. 3) in each of all the second hierarchical blocks BLK2 in the arithmetic processing device 100 by executing the third data transfer instruction.

Each data transfer instruction is a Single Instruction Multiple Data (SIMD) instruction that performs multiple data transfers by a single instruction. In order to prevent the disappearance of data that is not desired to be overwritten, the arithmetic processing device 100 may have a function of masking the data transfer between a part of elements.

Each arithmetic unit OPU includes an arithmetic operator EX (refer to FIG. 3) for executing various arithmetic operations. The arithmetic operator EX may include multiple arithmetic elements for performing, for example, different kinds of arithmetic operations (for example, a matrix product operation or an addition operation).

The various arithmetic instructions executed by the arithmetic processing device 100 are SIMD instructions that execute multiple arithmetic operations by a single instruction. In the present embodiment, based on a single arithmetic instruction, the arithmetic processing device 100 can cause all the arithmetic operators EX in the arithmetic processing device 100 to perform the arithmetic operation in parallel (including simultaneously).

Here, a degree of parallelism of the SIMD arithmetic operations performed by a normal SIMD processor depends on the number of registers assigned to the SIMD register. Meanwhile, a degree of parallelism of the SIMD arithmetic operations by the arithmetic processing device 100 depends on the number of the arithmetic operators EX in the arithmetic processing device 100. Accordingly, the arithmetic processing device 100 can operate as a huge SIMD processor.

The data transfer instruction and the arithmetic instruction in different hierarchies can be executed in parallel if resources do not conflict. Accordingly, the compiler device 10 in FIG. 1 can generate an instruction group including multiple instructions for which the resources do not conflict. The instruction group generated by the compiler device 10 is described in FIG. 6 to FIG. 11.

FIG. 3 is a block diagram illustrating an example of a system including a processor and a host on which the arithmetic processing device 100 in FIG. 2 is mounted. A processor 200 illustrated in FIG. 3 includes multiple arithmetic processing devices 100 and a memory MEM3 which are interconnected to each other. For example, the processor 200 may have a form of an electronic circuit board including multiple arithmetic processing devices 100 and the memory MEM3 mounted thereon. Multiple arithmetic processing device 100 may be mounted in a multi-chip package. The type of the memory MEM3 is not particularly limited, and the type may be appropriately selected depending on the performance required of the arithmetic processing device 100.

In FIG. 3, the processor 200 includes four arithmetic processing devices 100, but the number of arithmetic processing devices 100 is not limited to four and may be one or more. The memory MEM3 may be provided corresponding to each arithmetic processing device 100. The processor 200 including multiple arithmetic processing devices 100 operates as a single arithmetic processing device.

In each arithmetic processing device 100, the memory MEM2 of each second hierarchical block BLK2 is connected to the memory MEM3 and the memory MEM1 of each first hierarchical block BLK1 in the second hierarchical block BLK2, so that the data can be transferred to each other.

The memory MEM1 of each first hierarchical block BLK1 is connected to the memory MEM0 in each arithmetic unit OPU in the first hierarchical block BLK1, and the data can be transferred to each other. The data transfer instruction and the arithmetic instruction may be transferred from each memory MEM1 to the memory MEM0. The arithmetic operator EX in the arithmetic unit OPU performs various arithmetic operations using the memory MEM0 in the relevant arithmetic unit OPU.

A host memory HOSTM and the memory MEM3 may, for example, transmit and receive information such as data and an instruction via a Peripheral Component Interconnect express (PCIe) interface. Further, the transfer of information between the host memory HOSTM and the memory MEM3 may be performed by a Direct Memory Access (DMA).

Each arithmetic processing device 100 performs arithmetic processing based on the arithmetic instruction received from a host 300 and performs data transfer processing based on the data transfer instruction received from the host 300. The program including various instruction codes transmitted from the host 300 to the arithmetic processing device 100 is generated by the compiler device 10 in FIG. 1 and stored in the host memory HOSTM in the host 300.

Figure 4:
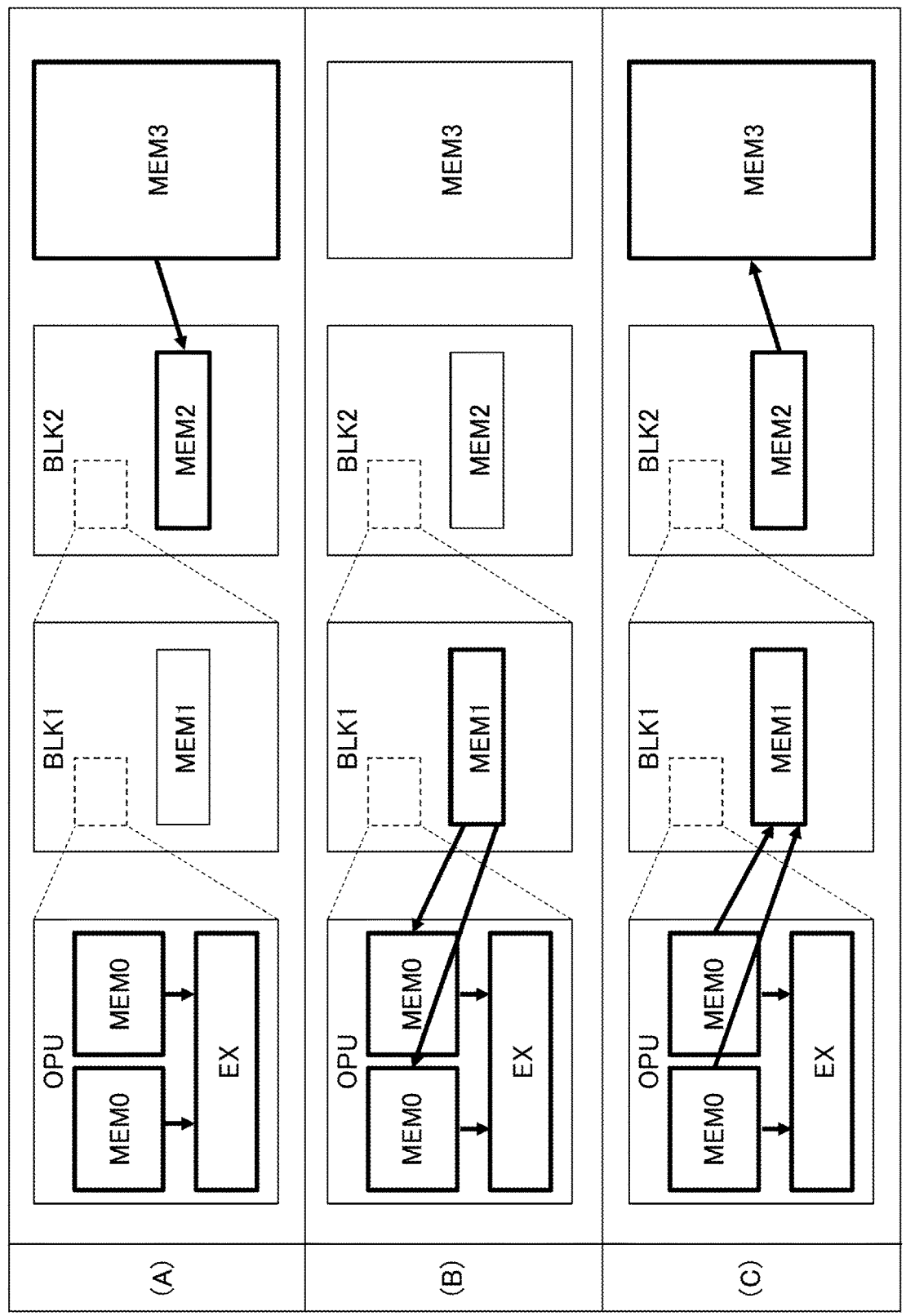
FIG. 4 is an explanatory diagram illustrating examples of an operations of the arithmetic processing device in FIG. 2.
Figure 5:
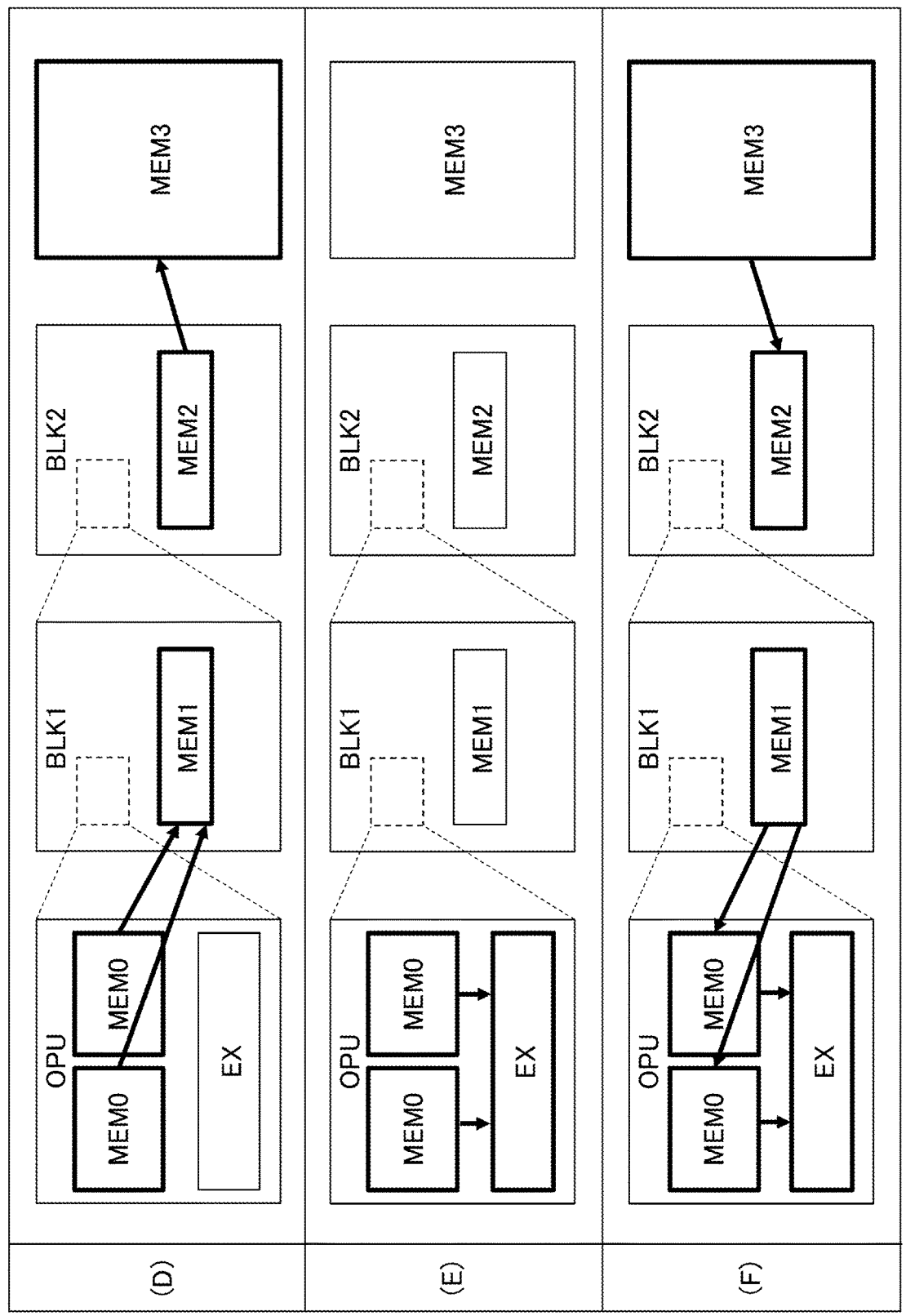
FIG. 5 is an explanatory diagram illustrating another example of an operation of the arithmetic processing device in FIG. 2.

FIG. 4 and FIG. 5 are explanatory diagrams illustrating an example of an operation of the arithmetic processing device 100 in FIG. 2. The arithmetic operations illustrated in FIG. 4 and FIG. 5 are implemented by the arithmetic processing device 100 executing multiple data transfer instructions and multiple arithmetic instructions in parallel. In FIG. 4 and FIG. 5, the elements represented by the bold frame indicate the resources used to perform a data transfer or an arithmetic operation. The arrows connecting the elements represented by the bold frames indicate a direction of the data transfer.

The number of cycles required for data transfer between the memory MEM2 and the memory MEM3 is greater than the number of cycles required for data transfer between the memory MEM1 and the memory MEM2 or the number of cycles required for data transfer between the memory MEM1 and the memory MEM0 in the arithmetic unit OPU of the arithmetic unit. Further, the execution cycles of various arithmetic operations performed by the arithmetic operator EX may be different. However, in the following description, when at least some execution cycles of data transfer processing and arithmetic processing overlap, the processing is performed in parallel (including simultaneous).

In (A) of FIG. 4, the arithmetic operator EX executes an arithmetic instruction that executes arithmetic operations in parallel using the data stored in the individual memories MEM0. Further, the arithmetic processing device 100 executes a data transfer instruction for transferring data from the memory MEM3 to the memory MEM2 in parallel with the arithmetic instruction.

In (A) of FIG. 4, the arithmetic instruction and the data transfer instruction using different resources can be executed in parallel. As illustrated in (A) of FIG. 4, when the compiler device 10 determines that the resources do not conflict, the compiler device 10 generates a single instruction group that can execute the arithmetic instruction and the data transfer instruction in parallel.

In (B) of FIG. 4, the arithmetic operator EX executes an arithmetic instruction that executes arithmetic operations in parallel using the data stored in the multiple memories MEM0 respectively. The arithmetic processing device 100 executes a data transfer instruction for transferring (writing) data from the memory MEM1 to each memory MEM0 in the arithmetic unit OPU including the arithmetic operator EX that executes the arithmetic operation in parallel with the arithmetic instruction. Here, it is assumed that the above-described unit (resource) related to the arithmetic operation and the data transfer do not conflict with each other in each memory MEM0.

In (B) of FIG. 4, since the unit related to the arithmetic operation does not conflict with the unit related to the data transfer, the arithmetic instruction and the data transfer instruction can be executed in parallel. On the other hand, if the unit related to the arithmetic operation conflicts with the unit related to the data transfer, the arithmetic instruction and the data transfer instruction cannot be executed in parallel, and are executed sequentially.

As illustrated in (B) of FIG. 4, when the compiler device 10 determines that the resources do not conflict, the compiler device 10 generates a single instruction group that can execute the arithmetic instruction and the data transfer instruction in parallel. On the other hand, when it is determined that the resources are in conflict, the compiler device 10 generates two instruction groups for sequentially executing the arithmetic instruction and the data transfer instruction.

In (C) of FIG. 4, the arithmetic operator EX executes an arithmetic instruction that executes arithmetic operations in parallel using the data stored in the multiple memories MEM0 respectively. The arithmetic processing device 100 executes a data transfer instruction for transferring data from the memory MEM0 in the arithmetic unit OPU including the arithmetic operator EX that performs the arithmetic operation to different areas in the memory MEM1 in parallel with the arithmetic instruction. Here, it is assumed that the above-described unit (resource) related to the arithmetic operation and the data transfer do not conflict with each other in each memory MEM0. Further, the arithmetic processing device 100 executes the data transfer instruction for the data transfer from the memory MEM2 to the memory MEM3 in parallel with the arithmetic instruction.

In (C) of FIG. 4, since the resources used for the arithmetic operation in the arithmetic operator EX and two data transfers do not conflict with each other, the compiler device 10 generates a single instruction group that can execute the arithmetic instruction and the two data transfer instructions in parallel. On the other hand, when the resource related to the arithmetic operation conflicts with the resource related to the data transfer to the memory MEM1, the compiler device 10 generates the arithmetic instruction independently and generates a single instruction group that can execute the two data transfer instructions in parallel.

In (D) of FIG. 5, the arithmetic processing device 100 executes a data transfer instruction that transfers data from multiple memories MEM0 in the arithmetic unit OPU to the memory MEM1. The arithmetic processing device 100 executes a data transfer instruction for transferring data from the memory MEM2 to the memory MEM3 in parallel with the data transfer instruction from the memory MEM0 to the memory MEM1.

In (D) of FIG. 5, the two data transfers can be performed in parallel because they do not conflict. Therefore, the compiler device 10 generates a single instruction group that can execute two data transfer instructions in parallel. Whether the two data transfers conflict depends on the architecture of arithmetic processing device 100, and the compiler device 10 may determine whether the two data transfers conflict considering the architecture. The compiler device 10 according to the present embodiment determines that the data transfer is in conflict when the data transfer destinations of multiple data transfer instructions are the same.

In (E) of FIG. 5, first and second arithmetic elements of the arithmetic operator EX execute the arithmetic instructions that execute the first and second arithmetic operations in parallel using data stored in the individual memories MEM0. Here, it is assumed that the units (resources) related to the above-described first and second arithmetic operations do not conflict with each other in each memory MEM0 and the arithmetic operator EX.

In (E) of FIG. 5, the resources related to the first and second arithmetic operations do not conflict. Therefore, the compiler device 10 generates a single instruction group that can execute the first and second arithmetic operations of the first and second arithmetic elements in parallel. Note that the compiler device 10 can include a data transfer between the memory MEM1 and the memory MEM2 or a data transfer between the memory MEM2 and the memory MEM3 in the instruction group. In (E) of FIG. 5, when the compiler device 10 determines that the memories MEM0 are in conflict, the compiler device 10 generates two arithmetic instructions that execute the first and second arithmetic operations respectively in the first and second arithmetic elements without generating the instruction group.

In (F) of FIG. 5, the arithmetic operator EX executes an arithmetic instruction that executes an arithmetic operation using the data stored in the memory MEM0. The arithmetic processing device 100 executes, in parallel with the arithmetic instruction, a data transfer instruction for transferring data from the memory MEM1 to the memory MEM0 in the arithmetic unit including the arithmetic operator EX for executing the arithmetic operation. Here, it is assumed that the above-described units (resources) related to arithmetic operation and data transfer do not conflict with each other in each memory MEM0. Further, the arithmetic processing device 100 executes the data transfer instruction for transferring data from the memory MEM3 to the memory MEM2 in parallel with the arithmetic instruction and the data transfer instruction described above.

In (F) of FIG. 5, since the resources used for performing the arithmetic operation by the arithmetic operator EX and the two data transfers do not conflict with each other, the compiler device 10 generates a single instruction group that can execute the arithmetic instruction and two data transfer instructions in parallel. The method of generating an instruction group when the compiler device 10 determines that resource conflicts is the same as that described in (C) of FIG. 4.

Hereinafter, in FIG. 6 to FIG. 11, an example of a process of merging instructions by the instruction merge unit 15 is described. For example, the processes illustrated in FIG. 6 to FIG. 11 describe an example of the compiler program executed by the compiler device 10 and an example of a compiling method executed by the compiler device 10. The method of generating an instruction by the compiler device 10 through the process illustrated in FIG. 6 to FIG. 11 is an example of a method of generating an instruction.

Figure 6:
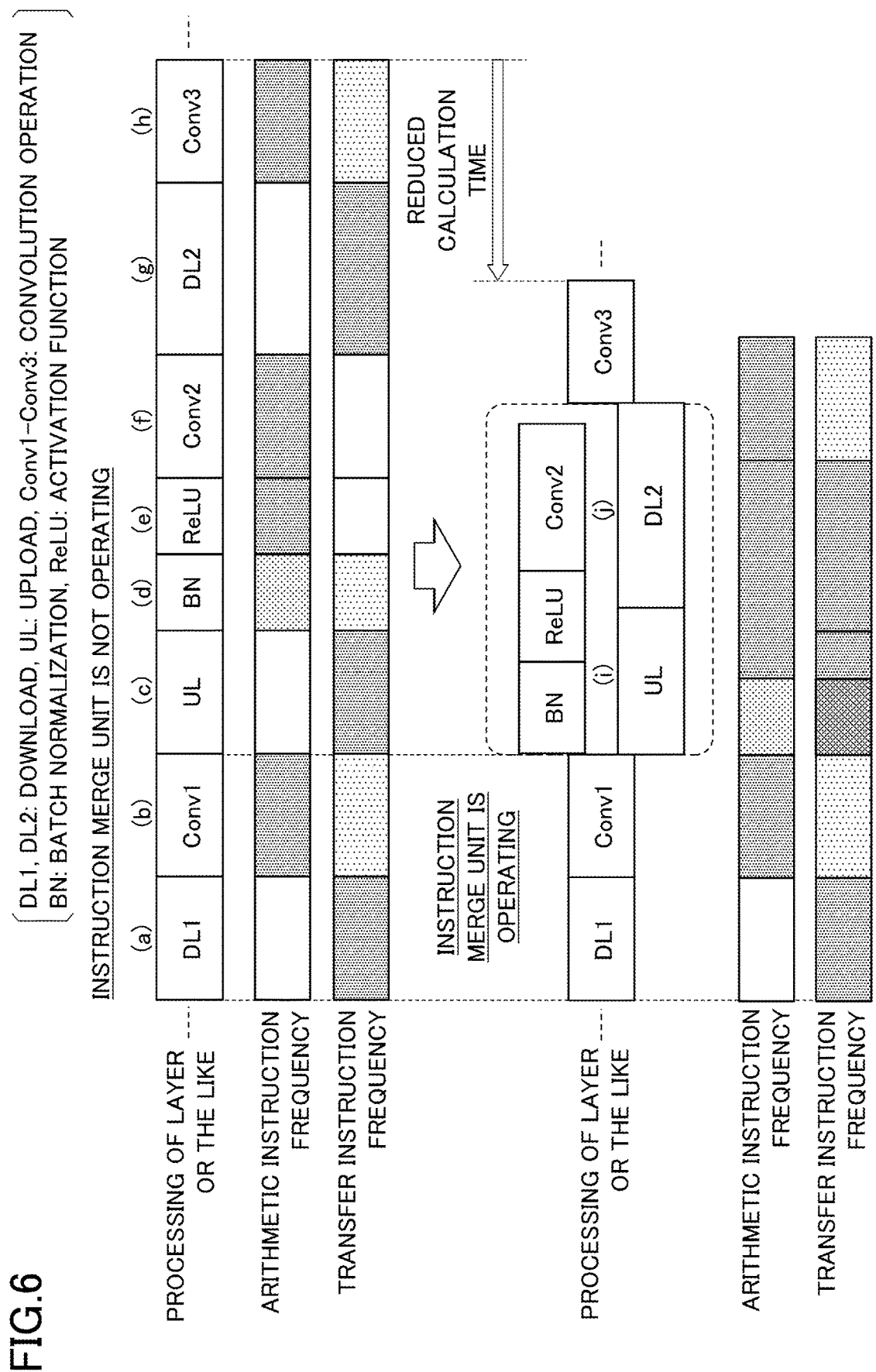
FIG. 6 is a diagram illustrating an example of processing using an instruction code generated by a compiler device when an instruction merge unit in FIG. 1 is not operated and when the instruction merge unit in FIG. 1 is operated.

FIG. 6 is a diagram illustrating an example of processing using an instruction code generated by the compiler device 10 when the instruction merge unit 15 of FIG. 1 is not operated and when the same instruction merge unit 15 is operated. A method in which the compiler device 10 operates the instruction merge unit 15 to generate an instruction code is an example of an instruction generation method. A download DL (e.g., DL1, DL2), an upload UL, a convolution operation Conv (e.g., Conv1, Conv2, Conv3), a batch normalization BN, and a ReLU function are each examples of basic operations. The shade of rectangles indicates the frequency of arithmetic instructions and the frequency of data transfer instructions. It is indicated that the darker the shade, the higher the execution frequency of instructions.

In the example illustrated in FIG. 6, the arithmetic processing device 100 executes the download DL1 that downloads data from the memory MEM3 to the memory MEM0 and executes the convolution operation Conv1 using the downloaded data ((a) and (b) in FIG. 6). The process of the download DL1 is performed using the data transfer instruction. The process of the convolution operation Conv1 is mainly performed using the arithmetic instruction.

Next, the arithmetic processing device 100 executes the upload UL that uploads the data obtained by, for example, the convolution operation Conv1 from the memory MEM0 to the memory MEM3 ((c) in FIG. 6). The process of the upload UL is performed using the data transfer instruction.

Further, the arithmetic processing device 100 sequentially executes the process of the batch normalization BN and the process of the ReLU function on the data obtained by the convolution operation Conv1 ((d) and (e) in FIG. 6). The process of the batch normalization BN and the process of the ReLU function are performed mainly using the arithmetic instruction. Next, the arithmetic processing device 100 executes the convolution operation Conv2 ((f) in FIG. 6).

Further, the arithmetic processing device 100 executes the download DL2 that downloads the data from the memory MEM3 to the memory MEM0 ((g) in FIG. 6). The arithmetic processing device 100 executes the convolution operation Conv3 using the downloaded data ((h) in FIG. 6). As described above, when the instruction merge unit 15 is not operated, the arithmetic processing device 100 sequentially performs processing of the deep neural network.

On the other hand, when the instruction merge unit 15 is operated, the instruction merge unit 15 generates a single instruction group including multiple instructions whose resources do not conflict, thereby making multiple basic operations executed in parallel. Accordingly, for example, the calculation time required for deep neural network training can be reduced and the processing performance of the arithmetic processing device 100 can be improved.

For example, the process of the upload UL1 is an example of a first process, and the process of the batch normalization BN and the process of the ReLU function are examples of a second process executed after the first process. In this case, the instruction sequence including an instruction that executes the process of the upload UL1 is an example of a first instruction sequence including the first instruction. The instruction sequence including an instruction that executes the process of the batch normalization BN and an instruction that executes the process of the ReLU function is an example of a second instruction sequence including the second instruction.

The process of the ReLU function and the process of the convolution operation Conv2 are examples of the first process, and the process of the download DL2 is an example of the second processing. In this case, the instruction sequence including an instruction that executes the process of the ReLU function and process of the convolution operation Conv2 is an example of the first instruction sequence including the first instruction. The instruction sequence including an instruction that executes the process of the download DL2 is an example of the second instruction sequence including the second instruction.

For example, the instruction merge unit 15 merges, into at least one instruction group, the arithmetic instruction used in the process of the batch normalization BN and the process of the ReLU function and the data transfer instruction used in the process of the upload UL in which the resources do not conflict ((i) in FIG. 6). Further, the instruction merge unit 15 merges, into at least one instruction group, the arithmetic instruction used in the process of the ReLU function and the process of the convolution operation Conv2 and the data transfer instruction used in the process of the download DL2 in which the resources do not conflict ((j) in FIG. 6).

The instruction group in which multiple instructions are merged is an example of a third instruction. The instruction merge unit 15 concatenates multiple instructions together with instructions other than those merged together to generate an instruction sequence (third instruction sequence) represented by a dashed line in FIG. 6. By merging the instructions, for example, data transfer instructions can be executed more frequently and data transfer efficiency can be increased. As a result, the processing performance of the arithmetic processing device 100 can be improved.

The conflicting resources in the arithmetic instruction and the data transfer instruction are the memory MEM0. Therefore, the instruction merge unit 15 can collectively generate the arithmetic instruction and the data transfer instruction if the resources of the memory MEM0 do not conflict with each other. The resource conflicts between the arithmetic instruction and the data transfer instructions are often less frequent than resource conflicts between arithmetic instructions. Therefore, when the arithmetic instruction and the data transfer instruction are merged, the compression efficiency of the number of instructions can be improved compared to the case where the arithmetic instructions are combined, and the processing performance of the arithmetic processing device 100 can be improved.

The instruction merge unit 15 does not merge the instructions when the processing result of the basic operation is changed by merge the instructions. In other words, the instruction merge unit 15 determines whether the processing result by the instruction sequence after the merge of the instructions of interest is equivalent to the processing result by the instruction sequence before the merge. When it is determined that the processing results are equivalent, the instruction merge unit 15 merges the instructions and generates an instruction group. Accordingly, a malfunction in which the arithmetic processing device 100 that executes the merged instruction sequence does not operate normally can be prevented.

Figure 10:
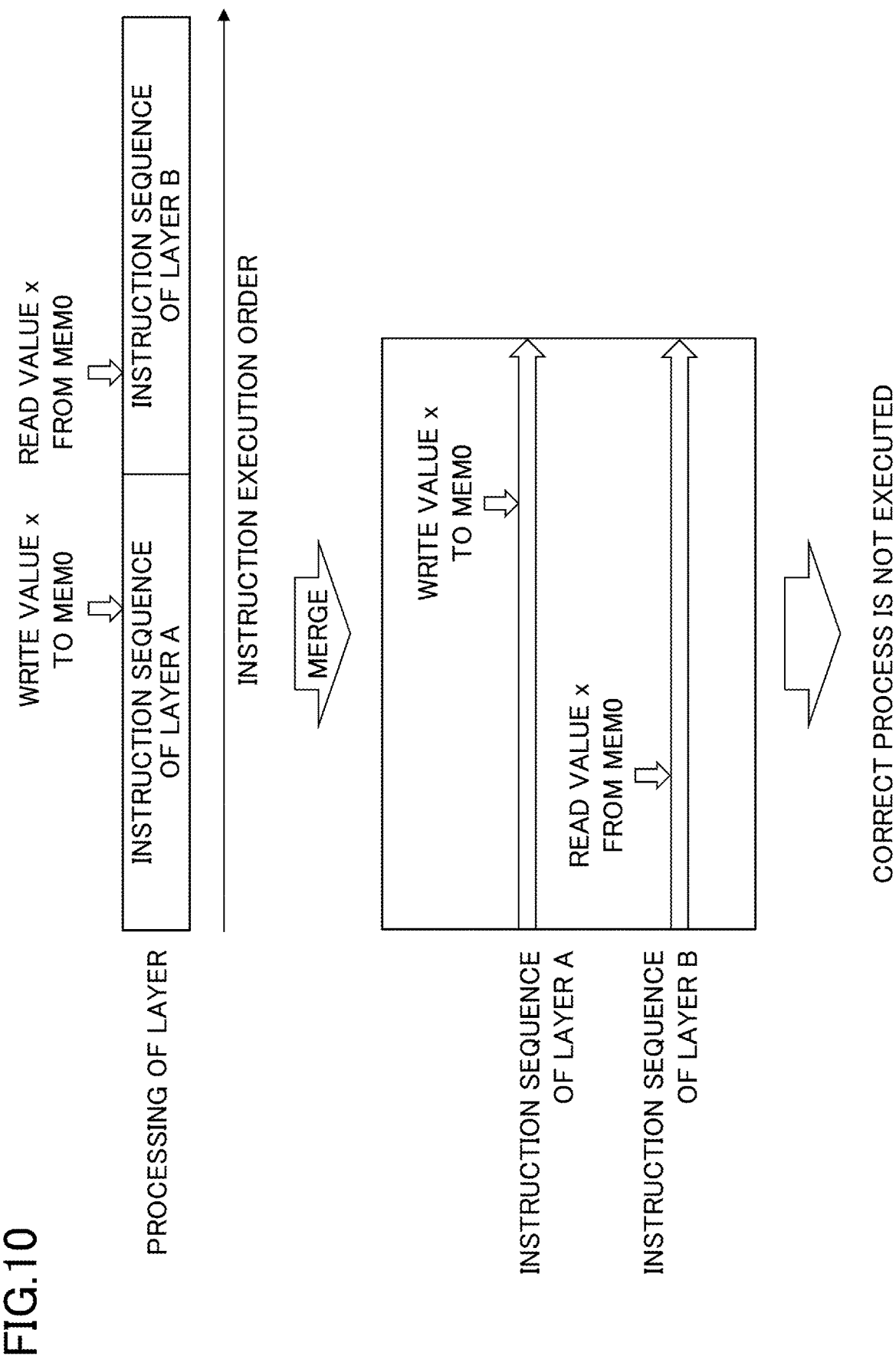
FIG. 10 is a diagram illustrating an example in which instructions cannot be merged due to a data dependency.
Figure 11:
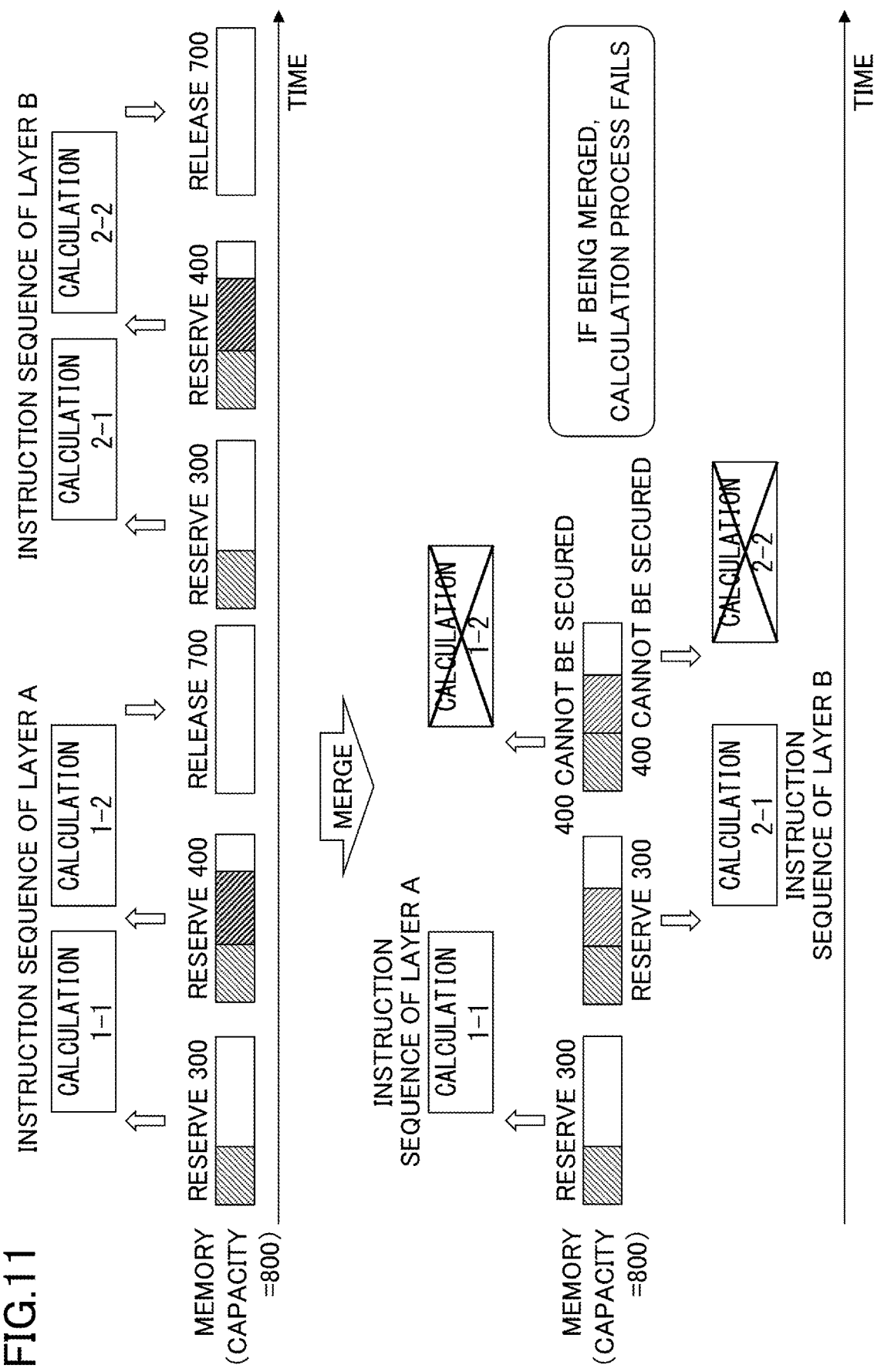
FIG. 11 is a diagram illustrating an example in which instructions cannot be merged due to insufficient memory.

For example, an example of a change in the processing result of the basic operation is when a data dependency breaks down or the memory size used is insufficient. An example of data dependency breaking down is illustrated in FIG. 10, and an example of insufficient memory size being used is illustrated in FIG. 11.

Figure 7:
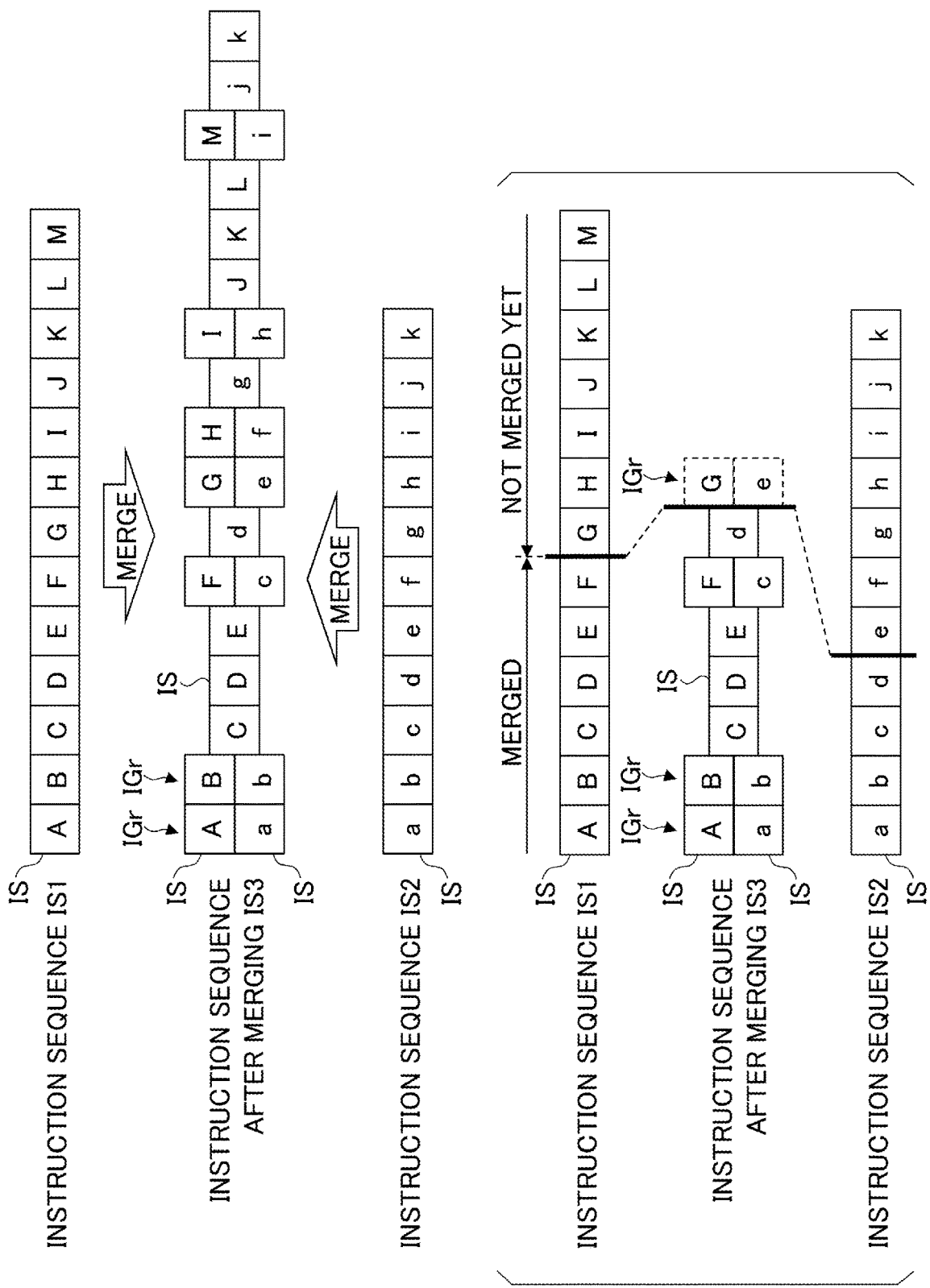
FIG. 7 is a diagram illustrating an example in which instructions are merged by the instruction merge unit in FIG. 1.

FIG. 7 is a diagram illustrating an example in which instructions are merged by the instruction merge unit 15 in FIG. 1. For example, the uppercase alphabet denotes an instruction sequence IS1 including an instruction IS used in the process of the batch normalization BN of FIG. 6. The lowercase alphabet indicates an instruction sequence IS2 including the instruction IS used in the process of the upload UL of FIG. 6. The instruction sequence IS1 is an example of the first instruction sequence, and the instruction IS included in instruction sequence IS1 is an example of the first instruction. The instruction sequence IS2 is an example of a second instruction sequence, and the instruction IS included in the instruction sequence IS2 is an example of the second instruction.

A single instruction IS includes multiple different instructions for each of multiple processing units capable of performing different types of processes in parallel, as described below with reference to FIG. 8 and FIG. 9. That is, a single instruction IS includes instructions for the first processing unit, instructions for the second processing unit, . . . , and instructions for the N-th processing unit. The instruction provided to the processing unit may include no operation (NOP). The plurality of processing units perform different types of processes (including the NOP) in parallel according to the plurality of different instructions provided at the same time.

The instruction merge unit 15 extracts the instruction IS that can be superimposed among the instructions IS included in each of the instruction sequence IS1 and the instruction sequence IS2, and generates an instruction group IGr by merging the extracted instructions IS. The instruction group IGr is an example of a third instruction. Then, the instruction merge unit 15 generates the instruction sequence IS3 including the instruction group IGr in which the instructions IS are merged and a single instruction IS that does not merge. The instruction sequence IS3 is an example of a third instruction sequence. For example, the instruction IS and the instruction group IGr included in the instruction sequences IS1, IS2, and IS3 are described at the machine language level.

As illustrated in FIG. 7, in the two instruction sequences IS1 and IS2, the number of instructions IS that can be merged is limited. However, by merging several instruction ISs as the instruction group IGr and enabling them to be executed in parallel, the execution rate of the instruction can be increased as compared to the case where instructions IS are executed sequentially, as illustrated in FIG. 6.

The state in the middle of the merge process is illustrated in the brackets in FIG. 7. A line before the thick line in the middle of instruction sequences IS1, IS2, and IS3 indicates that merging of instructions IS that can be merged has been performed, and a line after the thick line indicates that merging has not been performed. Instruction G, e, indicated by dashed frames, indicates instruction IS to be merged next.

As illustrated by the thick line, the instruction merge unit 15 recognizes the extent to which the merge process of the instruction sequences IS1 and IS2 has been performed, determines whether the next instruction (for example, G and e) can be merged. Then, when the merge is possible, the instruction merge unit 15 repeats the process of generating the instruction group IGr.

FIG. 8 and FIG. 9 are diagrams illustrating an example of merging two instructions. For example, Instruction 1 corresponds to the instruction IS of the instruction sequence IS1 of FIG. 7, and Instruction 2 corresponds to the instruction IS of the instruction sequence IS2 of FIG. 7. Instruction 1+2 indicates the instruction group merged between Instruction 1 and Instruction 2. In Instruction 1 and Instruction 2, "–" indicates that there is no instruction to be executed (NOP). That is, each of Instruction 1, Instruction 2, Instruction 1+2 where Instruction 1 and Instruction 2 are merged includes a plurality of different instructions for each of a plurality of processing units capable of performing different types of processes in parallel, similar to the instructions IS in FIG. 7. (A) to (C) of FIG. 8 and (D) to (F) of FIG. 9 correspond to the operation of (A) to (C) of FIG. 4 and (D) to (F) of FIG. 5, respectively.

In (A) in FIG. 8, the instruction merge unit 15 determines that merging is possible because there is no conflict in resources used for Instruction 1 including an arithmetic instruction to execute the first arithmetic operation by the arithmetic operator EX and Instruction 2 including a data transfer instruction for transferring data from the memory MEM3 to the memory MEM2. Therefore, the instruction merge unit 15 generates Instruction 1+2 that merges the arithmetic instruction and the data transfer instruction.

In (B) of FIG. 8, the instruction merge unit 15 determines that the resources used for Instruction 1 including the arithmetic instruction to execute the first arithmetic operation and Instruction 2 including the data transfer instruction for transferring data from the memory MEM1 to the memory MEM0 do not conflict conditionally. The condition in which resources do not conflict is that, for example, in each memory MEM0, the unit in which the result of the arithmetic instruction is written differs from the unit in which the data is transferred. When the condition is satisfied, the instruction merge unit 15 generates Instruction 1+2 that merges the arithmetic instruction and the data transfer instruction.

In (C) of FIG. 8, the instruction merge unit 15 determines that instruction 1 including the arithmetic instruction to execute the first arithmetic operation, Instruction 2 including the data transfer instruction for transferring data from the memory MEM0 to the memory MEM1, and a resource used for the data transfer instruction for transferring data from the memory MEM2 to the memory MEM3 do not conflict conditionally. The condition in which resources do not conflict is that the unit used in the arithmetic instruction and the unit used for data transfer are different in each memory MEM0.

When the condition is satisfied, the instruction merge unit 15 generates Instruction 1+2 that merges the arithmetic instruction and the two data transfer instructions. If the condition is not satisfied, the instruction merge unit 15 does not merge the single arithmetic instruction and the two data transfer instructions, and as a result, Instruction 1 and Instruction 2 are maintained as separate instructions. However, Instruction 1 may be merged with other instructions, and Instruction 2 may be merged with other instructions.

In (D) of FIG. 9, the instruction merge unit 15 determines that merging is possible because there is no conflict in resources used for Instruction 1 including the data transfer instruction for transferring data from the memory MEM0 to the memory MEM1 and Instruction 2 including the data transfer instruction for transferring data from the memory MEM2 to the memory MEM3. Therefore, the instruction merge unit 15 generates Instruction 1+2 that merges two data transfer instructions. The data transfer instruction for transferring data from the memory MEM0 to the memory MEM1 is an example of the first data transfer instruction. The data transfer instruction for transferring data from the memory MEM2 to the memory MEM3 is an example of the first data transfer instruction.

In the present embodiment, data transfer instructions are provided for each different memory hierarchy. Therefore, as illustrated in (D) of FIG. 9, the instruction merge unit 15 can determine that there is no conflict in the data transfer instruction in which the memory hierarchy does not overlap. As a result, the instruction generation process by the compiler device 10 can be executed efficiently.

In (E) of FIG. 9, the instruction merge unit 15 determines that the resources used in Instruction 1 including the first arithmetic instruction causing the arithmetic operator EX to execute the first arithmetic operation and Instruction 2 including the second arithmetic instruction causing the arithmetic operator EX to execute the second arithmetic operation do not conflict conditionally. The condition that the resources do not conflict is that the arithmetic elements performing the arithmetic operations differ from each other and that the units in the memory MEM0 used in the first and second arithmetic operations differ from each other. When the condition is satisfied, the instruction merge unit 15 generates Instruction 1+2 that merges the first arithmetic instruction and the second arithmetic instruction.

In (F) of FIG. 9, the instruction merge unit 15 determines that the resources used for Instruction 1 including the arithmetic instruction causing the arithmetic operator EX to execute the first arithmetic operation and Instruction 2 including the data transfer instruction for transferring data from the memory MEM1 to the memory MEM0 and the data transfer instruction for transferring data from the memory MEM3 to the memory MEM2 do not conflict with each other conditionally. The condition that the resources do not conflict is that the units used in the arithmetic instructions and the units used for data transfer are different in each memory MEM0.

When the condition is satisfied, the instruction merge unit 15 generates Instruction 1+2 that merges the arithmetic instruction with the two data transfer instructions. If the condition is not satisfied, the instruction merge unit 15 does not merge the single arithmetic instruction with the two data transfer instructions, and as a result, Instruction 1 and Instruction 2 are maintained as separate instructions.

FIG. 10 is a diagram illustrating an example in which instructions cannot be merged due to a data dependency. In FIG. 10, it is assumed that the processing of Layer A for writing a value x to the memory MEM0 and the processing of Layer B for reading the value x written to the memory MEM0 in the processing of Layer A are sequentially performed.

When merging the instruction sequence of Layer A and the instruction sequence of Layer B, the instruction merge unit 15 determines whether there is a dependency on the data read from and written to the memory MEM0. In the example of FIG. 10, there is a dependency on the data read from and written to the memory MEM0. When the instruction sequence of Layer A and the instruction sequence of Layer B are merged, the process of reading the value x from the memory MEM0 is performed before the value x is written to the memory MEM0. Therefore, the instruction merge unit 15 determines that the correct processing will not be executed if the instruction sequence is merged, and does not perform the merging the instruction sequences.

As described above, the instruction merge unit 15 temporarily restricts the merging of instruction sequences when there is a dependency on the data on the memory MEM0 or the like commonly used in Layer A and Layer B to which instructions are merged, and reading and writing of the merged data is not performed in the correct order. That is, as can be understood from the description of FIG. 7, for the data reading instruction and the writing instruction to the same memory MEM0, the instruction merge unit 15 waits for the merge process of the reading instruction of the instruction sequence of Layer B until at least the merge process of the writing instruction of the instruction sequence of Layer A is completed. Accordingly, it is possible to prevent a malfunction in which the arithmetic processing device 100 does not operate normally due to the breakdown of the data dependency. Instead of temporarily restricting the merging of the instruction sequences, the merging of the instruction sequences between the layers may be abandoned and the merging of instruction sequences between the layers concerned may not be performed at all.

FIG. 11 is a diagram illustrating an example in which instructions cannot be merged due to insufficient memory. The numerical value of a memory capacity described below is an example. For example, suppose that a calculation process (Calculations 1-1, 1-2, 2-1, and 2-2) is performed by using a memory with a capacity of 800 in common between the instruction sequence of Layer A and the instruction sequence of Layer B. The memory used for the calculation process may be distributed to multiple locations among the memory MEM0, MEM1, and MEM2.

The memory capacity required for Calculation 1-1 and Calculation 2-1 is 300, and the memory capacity required for Calculation 1-2 and Calculation 2-2 is 400. After executing Calculation 1-2, Layer A releases the memory capacity 700 allocated in Calculation 1-1 and Calculation 1-2. After executing Calculation 2-2, Layer B releases the memory capacity 700 allocated in Calculation 2-1 and Calculation 2-2. Without merging in this way, the memory capacity will not be insufficient.

When the instruction sequence of Layer A and the instruction sequence of Layer B are merged, the instruction merge unit 15 determines whether the calculation process of Layer A and Layer B can be performed without exceeding the memory capacity. In the example illustrated in FIG. 11, after the Calculation 1-1 and Calculation 2-1 are executed, the necessary memory capacity 400 cannot be secured in Calculation 1-2 and Calculation 2-2, respectively, and the calculation process fails.

When the memory capacity is insufficient due to the merge of instruction sequences, the instruction merge unit 15 suppresses the merging of instruction sequences. As a result, a malfunction in which the arithmetic processing device 100 fails to operate normally due to insufficient memory capacity can be prevented.

As described above, in the present embodiment, the instruction merge unit 15 generates a single instruction group including multiple instructions in which the resources do not conflict, thereby enabling multiple basic operations to be executed in parallel. Thus, for example, the calculation time required for deep neural network training can be reduced and the processing performance of the arithmetic processing device 100 can be improved.

The instruction merge unit 15 determines whether the processing result by the instruction sequence after merging of the instruction of interest is equivalent to the processing result by the instruction sequence before merging. When it is determined that the processing results are equivalent, the instruction merge unit 15 merges the instructions and generates a new instruction sequence. Accordingly, a malfunction in which the arithmetic processing device 100 that executes the merged instruction sequence does not operate normally can be prevented.

The instruction merge unit 15 temporarily restricts the merging of instruction sequences when there is a data dependency in the memory MEM0 or the like commonly used in Layer A and Layer B to which instructions are merged, and the reading and writing order of the merged data is incorrect. In this way, a malfunction in which the arithmetic processing device 100 fails to operate normally due to the breakdown of data dependency can be prevented.

When the memory capacity is insufficient due to the merging of instruction sequences, the instruction merge unit 15 suppresses the merging of instruction sequences. As a result, a malfunction in which arithmetic processing device 100 fails to operate normally due to insufficient memory capacity can be prevented.

As described in FIG. 6, when the arithmetic instruction and the data transfer instruction are grouped together into a single instruction, the compression efficiency of the number of instructions can be improved compared to the case where the arithmetic instructions are grouped, and the processing performance of the arithmetic processing device 100 can be improved. The data transfer instructions are provided for each memory hierarchy. Therefore, as illustrated in (D) of FIG. 9, the instruction merge unit 15 can determine that there is no conflict in the data transfer instruction in which the memory hierarchy does not overlap. Therefore, the instruction merge unit 15 can easily determine a conflict of the data transfer instruction between different memory hierarchies and can efficiently perform an instruction generation process by the compiler device 10.

Figure 12:
FIG. 12 illustrates an example of merging two instructions in a compiler device of another embodiment.

FIG. 12 illustrates an example of merging two instructions in a compiler device of another embodiment. FIG. 12 illustrates an example of an instruction generation method by a compiler device. The compiler device according to the present embodiment has the same functions as the second instruction code generation unit 14, the instruction merge unit 15, and the finalization unit 16 of the compiler device 10 illustrated in FIG. 1. That is, the compiler device of the present embodiment has the function of generating a new instruction by merging the instruction included in the first instruction sequence and the instruction included in the second instruction sequence.

Note that in the present embodiment, the instruction included in the first instruction sequence, the instruction included in the second instruction sequence, and the new instruction generated by merging the two instructions each include multiple different instructions for each of multiple processing units capable of performing different types of processes in parallel. That is, the instruction included in the instruction sequence and the new instruction generated by merging include the instructions for the first processing unit, instructions for the second processing unit, . . . , and instructions for the N-th processing unit. The instruction provided to the processing unit may include no operation (NOP). The plurality of processing units perform different types of processes (including the NOP) in parallel according to the plurality of different instructions provided at the same time.

For example, the arithmetic processing device executing the Instruction 1 and Instruction 2 illustrated in FIG. 12 is a Very Long Instruction Word (VLIW) processor and includes multiple processing units capable of executing different types of processes, such as an Arithmetic and Logic Unit (ALU) and two Floating Point Units (FPU) of FPU0 and FPU1. FIG. 12 illustrates an example where Instruction 1 includes two instructions with respect to the ALU and the FPU0 and a NOP instruction with respect to the FPU1, and Instruction 2 includes a NOP instruction with respect to the ALU and the FPU0 and an instruction with respect to FPU1, but each of Instruction 1 and Instruction 2 may include more than four instructions.

The instruction merge unit 15 determines whether the resource of Instruction 1 including an integer addition instruction (c<−a+b) and a floating-point addition instruction (f<−d+.e) conflicts with Instruction 2 including a floating-point multiplication instruction (z<−x*.y). The instruction merge unit 15 determines that Instruction 1 and Instruction 2 can be merged because the resources do not conflict between Instruction 1 and Instruction 2, and generates the instruction group (Instruction 1+2).

The integer addition instruction adds the data stored in integer registers a and b and stores the data in an integer register c. The floating-point addition instruction adds the data stored in floating-point registers d and e and stores the data in a floating-point register f. The addition sign "+." indicates the addition of floating-point numbers. The floating-point multiplication instruction multiplies the data stored in floating point registers x and y and stores the data in floating point register z. The multiplication sign "*." indicates the multiplication of floating-point numbers.

As described above, in the present embodiment, the same effect as in the previously described embodiment can be obtained. For example, in the present embodiment, Instruction 1 and Instruction 2 including at least one instruction to be executed by the VLIW processor are merged to generate an instruction group. This improves the execution efficiency of the VLIW processor and reduces the computation time compared to the case where Instruction 1 and Instruction 2 are not merged.

In each of the embodiments described above, a process of merging (combining) the first instruction in the first instruction sequence and the second instruction in the second instruction sequence into a single instruction is has been described. However, the process of merging the first instruction in the first instruction sequence and the second instruction in the second instruction sequence is also applicable to instruction sequence to be supplied to a superscalar type processor. The superscalar type processor can automatically detect two instructions that come before and after in the instruction sequence capable of being executed in parallel, and then execute them in parallel. For such a superscalar type processor, the compiler device 10 may execute a process of merging multiple instructions as follows. For the first instruction in the first instruction sequence and the second instruction in the second instruction sequence, if the processor is expected to execute the first instruction and the second instruction automatically in parallel by arranging the first instruction and the second instruction in front and back in the one instruction sequence, the compiler device 10 generates (summarizes) an instruction in which the first instruction and the second instruction are merged in a manner that the first instruction and the second instruction are arranged in front and back in parallel. In this case, the first and second instructions arranged in front and back correspond to the third instruction. With this process, it is expected that the processor can obtain the instruction sequence that can be executed in a higher degree of parallelism.

Some or all of the compiler device 10 or the host 300 in the embodiments described above may be configured in hardware or may be configured in software (programs) executed by a CPU or GPU, etc. When the information processing of the software is configured, the information processing of the software may be performed by storing the software that performs at least a portion of the functions of each device according to the above-described embodiment in a non-temporary storage medium (non-temporary computer-readable medium) such as a Compact Disc-Read Only Memory (CD-ROM) or a Universal Serial Bus (USB) memory, and allowing the computer to read the software. The software may also be downloaded via a communication network. Further, the information processing by the software may be performed by hardware by having all or part of the software processing be implemented in circuitry such as Application Specific Integrated Circuit (ASIC) or FPGA (Field Programmable Gate Array).

The storage medium storing the software may be removable, such as an optical disk, or may be a fixed storage medium, such as a hard disk or a memory. The storage medium may also be provided within the computer (main storage, auxiliary storage, etc.) or external to the computer.

Figure 13:
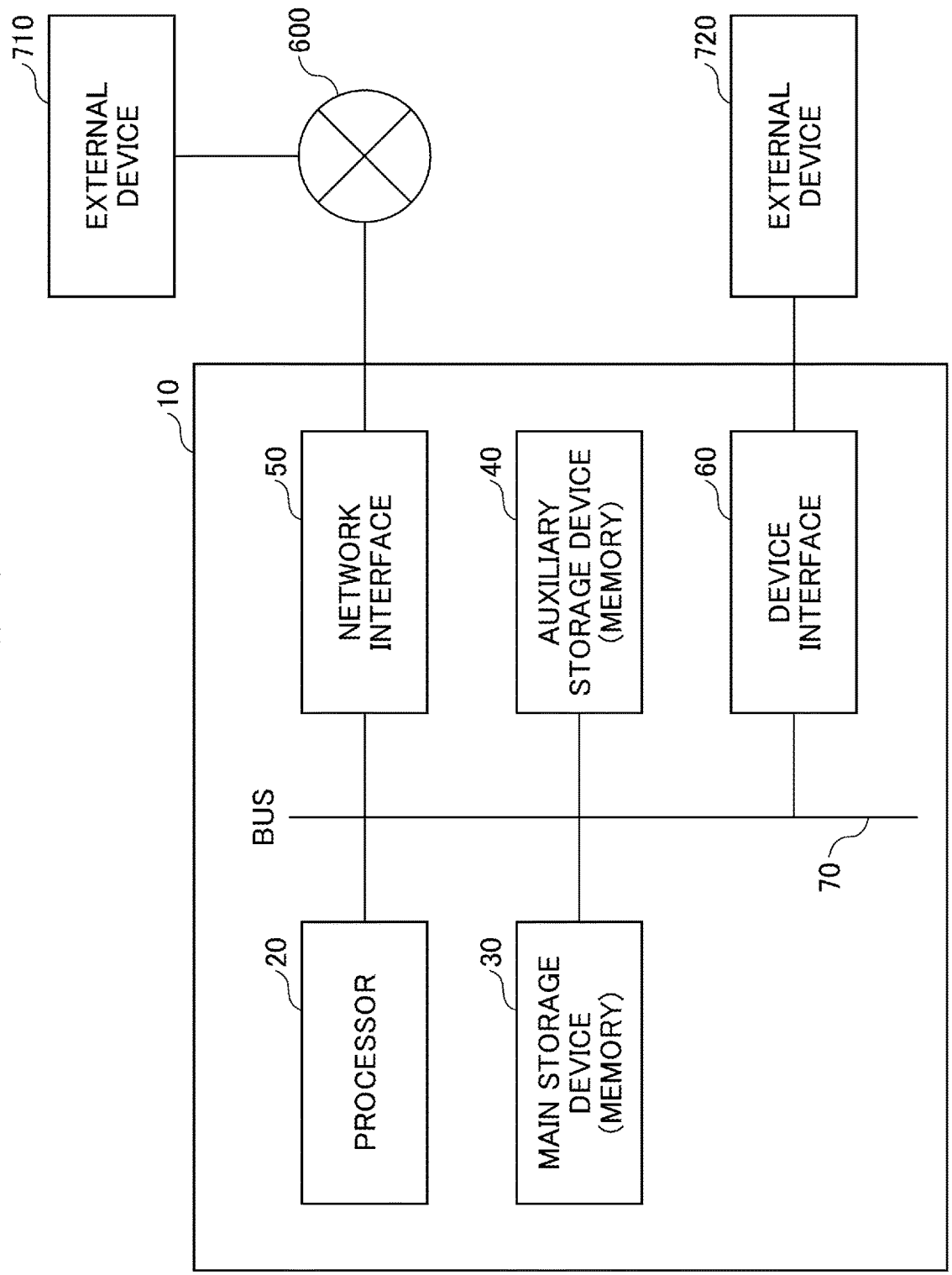
FIG. 13 is a block diagram illustrating an example of a hardware configuration of a compiler device illustrated in FIG. 1.

FIG. 13 is a block diagram illustrating an example of a hardware configuration of the compiler device 10 illustrated in FIG. 1. The hardware configuration of the host 300 illustrated in FIG. 3 is similar to the hardware configuration of the compiler device 10 illustrated in FIG. 13. The compiler device 10 includes, by way of example, a processor 20, a main storage device 30, an auxiliary storage device 40, a network interface 50, and a device interface 60, which may be implemented as a computer connected via a bus 70. For example, when the processor 20 executes a compiler program, the operations described in FIG. 6 to FIG. 12 are performed.

The compiler device 10 includes one of each component but may include more than one component. Further, although one compiler device 10 is illustrated in FIG. 13, the software may be installed in multiple compiler devices 10 to perform the same or different processing of the software by each of multiple compiler devices 10. In this case, each of the compiler devices 10 may be in the form of distributed computing which communicates via a network interface 50 or the like to perform processing. That is, the compiler device 10 according to the above-described embodiment may be configured as a system in which one or more compiler devices 10 executes instructions stored in one or more storage devices and performs functions. Further, the compiler device 10 may be configured to process the information transmitted from the terminal by one or more compiler devices 10 disposed on the cloud and transmit the processing result to the terminal.

Various operations for implementing the operations described in FIG. 6 to FIG. 11 may be performed in parallel using one or more processors 20 or using multiple computers over a network. Further, various operations may also be performed in parallel by distributing them into multiple arithmetic cores in the processor 20. Further, some or all of the processing, means, etc. of the present disclosure may be implemented by at least one of a processor and a storage device provided on a cloud capable of communicating with the compiler device 10 via a network. Thus, the compiler device 10 in the embodiments described above may be in the form of parallel computing by one or more computers.

The processor 20 may be at least electronic circuitry (such as a processing circuitry, a processing circuit, a CPU, a GPU, an FPGA, an ASIC, etc.) that controls or performs calculating on a computer. The processor 20 may also be either a general-purpose processor, a dedicated processing circuit designed to perform a particular operation, or a semiconductor device including both a general-purpose processor and a dedicated processing circuit. The processor 20 may also include optical circuitry or may have a computing function based on quantum computing.

The processor 20 may perform arithmetic processing based on software or data input from each device or the like of the internal configuration of the compiler device 10, and may output the arithmetic operation result or the control signal to each device or the like. The processor 20 may control the components constituting the compiler device 10 by executing an operating system (OS) of the compiler device 10, an application, or the like.

The compiler device 10 in the embodiments described above may be implemented by one or more processors 20. Here, the processor 20 may also refer to one or more electronic circuits provided on one chip, or may refer to one or more electronic circuits disposed on two or more chips or two or more devices. When multiple electronic circuits are used, each electronic circuit may communicate by performing wired communication or wireless communication.

The main storage device 30 may be a storage device that stores instructions and various data executed by the processor 20, and the various data stored in the main storage device 30 may be read by the processor 20. The auxiliary storage device 40 may be a storage device other than main storage device 30. Each of these storage devices may be any electronic component that can store electronic information, and may be a semiconductor memory. The semiconductor memory may be either a volatile memory or a non-volatile memory. The storage device that stores various data in the compiler device 10 according to the above-described embodiments may be implemented by the main storage device 30 or the auxiliary storage device 40.

Where the compiler device 10 in the above-described embodiments includes at least one storage device (memory) and at least one processor 20 connected (coupled) to the at least one storage device, the at least one processor 20 may be connected to the one storage device. Further, at least one storage device may be connected to one of the processors 20. The at least one of the plurality of processors 20 may also include a configuration in which the processor 20 is connected to the at least one of the plurality of storage devices. This configuration may also be implemented by the storage devices and the processor 20 included in the plurality of compiler devices 10. Further, the storage may include a configuration (e.g., a cache memory including an L1 cache, an L2 cache) in which the storage is integrated with the processor 20.

The network interface 50 may be an interface that connects to the communication network 600 by wireless or wired communication. An appropriate interface, such as an interface that conforms to an existing communication standard, may be used for the network interface 50. The network interface 50 may exchange information with an external device 710 connected via a communication network 600. The communication network 600 may be any one or a combination of a wide area network (WAN), a local area network (LAN), a personal area network (PAN), or the like. Also, information may be exchanged between the compiler device 10 and the external device 710. An example of the WAN may be the Internet, an example of the LAN may be IEEE 802.11 or Ethernet, and an example of the PAN may be Bluetooth® or near field communication (NFC).

The device interface 60 may be an interface, such as a USB that directly connects to the external device 720.

The external device 710 may be a device connected to the compiler device 10 via a communication network 600. The external device 720 may be a device connected directly to the compiler device 10.

The external device 710 or the external device 720 may be, for example, an input device. The input device may be, for example, a camera, a microphone, a motion capture, various sensors, a keyboard, a mouse, a touch panel, or the like, and provides the acquired information to the compiler device 10. The device may also include an input portion, such as a personal computer, a tablet terminal, or a smartphone, a memory, and a processor.

The external device 710 or the external device 720 may also be an output device as an example. The output device may be, for example, a display device such as a Liquid Crystal Display (LCD) or an organic electroluminescent (EL) panel, may be a speaker for outputting voice or the like, or may be a device comprising an output portion such as a personal computer, a tablet terminal, or a smartphone, a memory, and a processor.

The external device 710 or the external device 720 may be a storage device (memory). For example, the external device 710 may be a network storage or the like, and the external device 720 may be a storage, such as an HDD.

The external device 710 or the external device 720 may also be a device having a function of a component of the compiler device 10 in the embodiments described above. That is, the compiler device 10 may transmit some or all of the processing results of the external device 710 or the external device 720, or the compiler device 10 may receive some or all of the processing results from the external device 710 or the external device 720.

In the present specification (including the claims), if the expression "at least one of a, b, and c" or "at least one of a, b, or c" is used (including similar expressions), any one of a, b, c, a-b, a-c, b-c, or a-b-c is included. Multiple instances may also be included in any of the elements, such as a-a, a-b-bb, and a-a-b-b-c-c. Further, the addition of another element other than the listed elements (i.e., a, b, and c), such as adding d as a-b-c-d, is included.

In the present specification (including the claims), if the expression such as "data as an input", "using data", "based on data", "according to data", or "in accordance with data" (including similar expressions) is used, unless otherwise noted, a case in which various data themselves are used as an input and a case in which data obtained by processing various data (e.g., data obtained by adding noise, normalized data, a feature amount extracted from data, and intermediate representation of various data) are used as an input are included. If it is described that any result can be obtained "data as an input", "using data", "based on data", "according to data", or "in accordance with data" (including similar expressions), there are no particular exceptions, a case in which the result is obtained based on only the data are included, and a case in which the result is obtained affected by another data other than the data, factors, conditions, and/or states may be included. If it is described that "data are output" (including similar expressions), unless otherwise noted, a case in which various data themselves are used as an output is included, and a case in which data obtained by processing various data in some way (e.g., data obtained by adding noise, normalized data, a feature amount extracted from data, and intermediate representation of various data) are used as an output is included.

In the present specification (including the claims), if the terms "connected" and "coupled" are used, the terms are intended as non-limiting terms that include any of direct, indirect, electrically, communicatively, operatively, and physically connected/coupled. Such terms should be interpreted according to a context in which the terms are used, but a connected/coupled form that is not intentionally or naturally excluded should be interpreted as being included in the terms without being limited.

In the present specification (including the claims), if the expression "A configured to B" is used, a case in which a physical structure of the element A has a configuration that can perform the operation B, and a permanent or temporary setting/configuration of the element A is configured/set to actually perform the operation B may be included. For example, if the element A is a general-purpose processor, the processor may have a hardware configuration that can perform the operation B and be configured to actually perform the operation B by setting a permanent or temporary program (i.e., an instruction). If the element A is a dedicated processor or a dedicated arithmetic circuit, a circuit structure of the processor may be implemented so as to actually perform the operation B irrespective of whether the control instruction and the data are actually attached.

In the present specification (including the claims), if a term indicating containing or possessing (e.g., "comprising/including" and "having") is used, the term is intended as an open-ended term, including an inclusion or possession of an object other than a target object indicated by the object of the term. If the object of the term indicating an inclusion or possession is an expression that does not specify a quantity or that suggests a singular number (i.e., an expression using "a" or "an" as an article), the expression should be interpreted as being not limited to a specified number.

In the present specification (including the claims), even if an expression such as "one or more" or "at least one" is used in a certain description, and an expression that does not specify a quantity or that suggests a singular number (i.e., an expression using "a" or "an" as an article) is used in another description, it is not intended that the latter expression indicates "one". Generally, an expression that does not specify a quantity or that suggests a singular number (i.e., an expression using "a" or "an" as an article) should be interpreted as being not necessarily limited to a particular number.

In the present specification, if it is described that a particular advantage/result is obtained in a particular configuration included in an embodiment, unless there is a particular reason, it should be understood that that the advantage/result may be obtained in another embodiment or other embodiments including the configuration. It should be understood, however, that the presence or absence of the advantage/result generally depends on various factors, conditions, states, and/or the like, and that the advantage/result is not necessarily obtained by the configuration. The advantage/result is merely an advantage/result that results from the configuration described in the embodiment when various factors, conditions, states, and/or the like are satisfied, and is not necessarily obtained in the claimed invention that defines the configuration or a similar configuration.

In the present specification (including the claims), if multiple hardware performs predetermined processes, each of the hardware may cooperate to perform the predetermined processes, or some of the hardware may perform all of the predetermined processes. Additionally, some of the hardware may perform some of the predetermined processes while other hardware may perform the remainder of the predetermined processes. In the present specification (including the claims), if an expression such as "one or more hardware perform a first process and the one or more hardware perform a second process" (including similar expressions) is used, the hardware that performs the first process may be the same as or different from the hardware that performs the second process. That is, the hardware that performs the first process and the hardware that performs the second process may be included in the one or more hardware. The hardware may include an electronic circuit, a device including an electronic circuit, or the like.

In the present specification (including the claims), if multiple storage devices (memories) store data, each of the multiple storage devices (memories) may store only a portion of the data or may store an entirety of the data. It may also include a configuration in which some of the plurality of storage devices store data.

Although the embodiments of the present disclosure have been described in detail above, the present disclosure is not limited to the individual embodiments described above. Various additions, modifications, substitutions, partial deletions, and the like may be made without departing from the conceptual idea and spirit of the invention derived from the contents defined in the claims and the equivalents thereof. For example, in all of the embodiments described above, numerical values or mathematical expressions used for description are presented as an example and are not limited to them. Additionally, the order of respective operations described in the embodiment is presented as an example and is not limited thereto.

What is claimed is:

1. A compiler device for generating an instruction sequence to be executed by an arithmetic processing device, the compiler device comprising at least one memory and at least one processor,
wherein the at least one processor is configured to:
receive a first instruction sequence for executing a first process and a second instruction sequence for executing a second process to be executed after the first process;
generate one or more third instructions, each third instruction being generated by merging a first instruction included in the first instruction sequence and a second instruction included in the second instruction sequence, the first instruction and the second instruction being executable in parallel; and
generate a third instruction sequence by concatenating the one or more third instructions, instructions included in the first instruction sequence that are not merged into the one or more third instructions, and instructions included in the second instruction sequence that are not merged into the one or more third instructions.

2. The compiler device according to claim 1, wherein the arithmetic processing device includes a plurality of hierarchical memories and is connected to an external memory,
wherein the first instruction causes data to be transferred between adjacent two hierarchical memories in the arithmetic processing device, and the second instruction causes data to be transferred between the arithmetic processing device and the external memory.

3. The compiler device according to claim 1, wherein the third instruction sequence is generated such that a processing result of the third instruction sequence is equivalent to a processing result of sequentially executing the first instruction sequence and the second instruction sequence.

4. The compiler device according to claim 3, wherein the at least one processor is further configured to:
determine whether a processing result when a first instruction of interest in the first instruction sequence and a second instruction of interest in the second instruction sequence are merged into the third instruction is equivalent to a processing result of when instructions are not merged; and
generate the third instruction, by merging the first instruction of interest and the second instruction of interest such that the processing results with and without merging of the first and second instructions of interest are determined to be equivalent.

5. The compiler device according to claim 4, wherein the at least one processor is further configured to:
determine whether a data dependency exists between the first process by the first instruction sequence and the second process by the second instruction sequence; and
upon determining that the data dependency exists, stop generating the third instruction sequence in a case where the data dependency is broken due to a generation of the third instruction.

6. The compiler device according to claim 4, wherein the at least one processor is further configured to stop generating the third instruction sequence when a capacity of a memory used during an execution of the third instruction sequence exceeds a capacity of a memory used by the arithmetic processing device.

7. The compiler device according to claim 1, wherein the first instruction is an arithmetic instruction that causes an arithmetic operator included in the arithmetic processing device to execute an arithmetic operation and the second instruction is a data transfer instruction with respect to a memory included in the arithmetic processing device, or
the second instruction is the arithmetic instruction that causes the arithmetic operator included in the arithmetic processing device to execute the arithmetic operation and the first instruction is the data transfer instruction with respect to the memory included in the arithmetic processing device.

8. The compiler device according to claim 7, wherein the third instruction is generated by merging a first data transfer instruction included in the first instruction sequence and a second data transfer instruction included in the second instruction sequence.

9. The compiler device according to claim 7, wherein the memory used by the arithmetic processing device includes a plurality of memories having different hierarchies, and the data transfer instruction is provided for each data transfer between different hierarchies of memory.

10. The compiler device according to claim 9, wherein one of the plurality of memories having different hierarchies includes a register for storing data used by the arithmetic processing device for executing the arithmetic operation.

11. The compiler device according to claim 1, wherein each of the first instruction, the second instruction, and the third instruction includes a plurality of different instructions with respect to a plurality of processing units capable of executing different types of processes in parallel, and the plurality of processing units are included in the arithmetic processing device.

12. The compiler device according to claim 11, wherein
the plurality of different instructions included in the first instruction has an operation instruction for one of the plurality of processing units, and a no-operation (NOP) instruction for another one of the plurality of processing units,
the plurality of different instructions included in the second instruction has a NOP instruction for the one of the plurality of processing units, and an operation instruction for the another one of the plurality of processing units, and
the plurality of different instructions included in the third instruction has the operation instruction included in the first instruction for the one of the plurality of processing units, and the operation instruction included in the second instruction for the another one of the plurality of processing units.

13. The compiler device according to claim 1, wherein each instruction included in the first instruction sequence, the second instruction sequence and the third instruction sequence is described at a machine language level.

14. The compiler device according to claim 1, wherein the third instruction sequence is transmitted, instead of the first and second instruction sequences, to the arithmetic processing device outside the compiler device, and the arithmetic processing device executes the third instruction sequence.

15. The compiler device according to claim 1, wherein each instruction included in the third instruction sequence is a Single Instruction Multiple Data (SIMD) instruction for a SIMD processor, and the arithmetic processing device is the SIMD processor.

16. The compiler device according to claim 1, wherein each of the first instruction sequence and the second instruction sequence is one of a plurality of instruction sequences, each of the plurality of instruction sequences relating to at least an arithmetic operation and a data transfer with respect to a corresponding layer of a deep neural network.

17. An instruction generation method of generating the third instruction sequence using the compiler device of claim 1.

18. A non-transitory computer-readable recording medium having stored therein a program executed by the arithmetic processing device including the third instruction sequence to be generated using the compiler device of claim 1.

19. A compiling method of generating an instruction sequence to be executed by an arithmetic processing device, the compiling method comprising:
receiving a first instruction sequence for executing a first process and a second instruction sequence for executing a second process to be executed after the first process;
generating one or more third instructions, each third instruction being generated by merging a first instruction included in the first instruction sequence and a second instruction included in the second instruction sequence, the first instruction and the second instruction being executable in parallel; and
generating a third instruction sequence by concatenating the one or more third instructions, instructions included in the first instruction sequence that are not merged into the one or more third instructions, and instructions included in the second instruction sequence that are not merged into the one or more third instructions.

20. A non-transitory computer-readable recording medium having stored therein a compiler program for generating an instruction sequence to be executed by an arithmetic processing device, the compiler program causing a computer to execute to:
receive a first instruction sequence for executing a first process and a second instruction sequence for executing a second process to be executed after the first process;
generate one or more third instructions, each third instruction being generated by merging a first instruction included in the first instruction sequence and a second instruction included in the second instruction sequence, the first instruction and the second instruction being executable in parallel; and
generate a third instruction sequence by concatenating the one or more third instructions, instructions included in the first instruction sequence that are not merged into the one or more third instructions, and instructions included in the second instruction sequence that are not merged into the one or more third instructions.

* * * * *